United States Patent [19]

Gould et al.

[11] 4,246,099

[45] Jan. 20, 1981

[54] AEROBIC/ANAEROBIC SLUDGE DIGESTION PROCESS

[75] Inventors: Michael S. Gould, Dakar, Senegal; Ladistas C. Motsch, Amherst, N.Y.

[73] Assignee: Union Carbide Corporation, New York, N.Y.

[21] Appl. No.: 27,801

[22] Filed: Apr. 6, 1979

Related U.S. Application Data

[63] Continuation of Ser. No. 928,099, Jul. 26, 1978, abandoned, which is a continuation-in-part of Ser. No. 841,902, Oct. 13, 1977, abandoned, which is a continuation-in-part of Ser. No. 766,770, Feb. 8, 1977, abandoned.

[51] Int. Cl.³ ............................................... C02C 1/14
[52] U.S. Cl. ..................................... 210/603; 210/607; 210/613; 210/621; 210/630; 48/197 A; 210/627; 210/609; 210/629
[58] Field of Search ........................................ 210/3–8, 210/10–12, 14–16, 65–67, 71, 180.2, 195.3, 197; 48/197 A

[56] References Cited

U.S. PATENT DOCUMENTS

| 2,190,598 | 2/1940 | Fischer | 210/12 |
|---|---|---|---|
| 2,430,519 | 11/1947 | Mallory | 210/12 |
| 2,442,241 | 5/1948 | Koruzo et al. | 210/5 |
| 2,875,151 | 2/1959 | Davidson | 210/16 |
| 2,975,122 | 3/1961 | Laboon | 210/12 |
| 3,256,179 | 6/1966 | Teletzke et al. | 210/12 |
| 3,259,566 | 7/1966 | Torpey | 210/16 |
| 3,487,015 | 12/1969 | Boester | 210/12 |
| 3,670,887 | 6/1972 | McWhirter | 210/15 |
| 3,701,727 | 10/1972 | Kormanik | 210/14 |
| 3,838,198 | 9/1974 | Bellamy et al. | 210/6 |
| 3,864,247 | 2/1975 | Fuchs | 210/12 |
| 3,926,794 | 12/1975 | Vahldieck | 210/12 |
| 3,959,125 | 5/1976 | Teletzke | 210/10 |
| 4,026,793 | 5/1977 | Rein | 210/12 |
| 4,067,801 | 1/1978 | Ishida et al. | 210/5 |

FOREIGN PATENT DOCUMENTS

| 181574 | 4/1955 | Austria | 210/12 |
|---|---|---|---|
| 198211 | 6/1958 | Austria | 210/12 |
| 1584959 | 2/1970 | Fed. Rep. of Germany | 210/12 |
| 1584958 | 2/1970 | Fed. Rep. of Germany | 210/12 |

OTHER PUBLICATIONS

Conrad, J. R. et al., "*Anaerobic Acidogenesis of Wastewater Sludge*", W.P.C.F. Journal, vol. 47, No. 1, Jan. 1975, pp. 30-45.

*Primary Examiner*—Benoit Castel
*Attorney, Agent, or Firm*—Steven J. Hultquist

[57] ABSTRACT

A process for digestion of sludge wherein the sludge is oxygenated in a first digestion zone at temperature of from 35° to 75° C. to partially reduce the biodegradable volatile suspended solids content of the sludge. The partially stabilized sludge is anaerobically digested in a covered second digestion zone at temperature of from 25° to 60° C. to further reduce the biodegradable volatile suspended solids content of the sludge, to less than about 40% of the biodegradable volatile suspended solids content of the sludge introduced to the first digestion zone.

30 Claims, 4 Drawing Figures

AEROBIC/ANAEROBIC SLUDGE DIGESTION PROCESS

This application is a continuation of our prior U.S. application: Ser. No. 928,099 filed July 26, 1978 which is a continuation-in-part of application Ser. No. 841,902 filed Oct. 13, 1977 which is a continuation-in-part of application Ser. No. 766,770 filed Feb. 8, 1977, all now abandoned.

BACKGROUND OF THE INVENTION

1. Field of the Invention

This invention relates generally to a process for warm digestion of sludge, carried out under aerobic and anaerobic conditions.

2. Description of the Prior Art

With continued growth of industry and population, the problems associated with wastewater disposal are correspondingly increased. Although physical, chemical and biological treatment systems have been developed which can efficiently treat polluted waters to produce an effluent suitable for release to natural receiving water, almost all of the basic wastewater treatment systems currently in use, including clarification, chemical precipitation, biological filtration and activated sludge, convert the water pollutants into a concentrated form called sludge, Particularly in the activated sludge process, which is among the most popular of conventionally employed wastewater treatment systems, there is usually a significant net positive production of volatile suspended solids (MLVSS), i.e., the rate of cell synthesis exceeds the rate of cell destruction. Therefore, an increasing inventory of sludge builds up and the excess activated sludge must be discarded from the process continuously or periodically.

As the overall volumes of wastewater requiring treatment increases, particularly under the impetus of increasingly stringest pollution control legislation, the quantity of waste sludge produced by the above-mentioned wastewater treatment processes is correspondingly increased. Accordingly, it is highly desirable to process this waste sludge in such manner that it can be readily and economically disposed of without creating further pollution of the ecosphere. While much effort has been spent in development of improvements in sludge treatment technology as well as in refinement of existing sludge treatment processes, there still exists a great need for better and more efficient sludge treatment systems.

The basic aim of all sludge treatment processes is to economically and efficiently reduce and stabilize sludge solids. In addition, the sludge treatment system should desirably also produce an end product which is fully suitable for final disposal without further physical or chemical treatment. In conventional practice sludge disposal is commonly carried out by either ocean dumping, combustion, land filling or land spreading. In many instances, land disposal is employed and is particularly attractive due to minimal long-term environmental effects. In fact, land spreading of sludge may be highly advantageous in promoting reconditioning of the soil. However, the use of land spreading as a final sludge disposal method requires a well-pasteurized end product, so that the concentration of pathogenic organisms in the sludge is sufficiently low to avoid a potential health hazard in disposition of the sludge.

Traditionally, three distinct processes have been widely utilized for treating waste sludge: oxidation ponds, anaerobic digestion and aerobic digestion.

Oxidation ponds are generally employed in the form of comparatively shallow excavated basins in the earth which extend over an area of land and retain wastewater prior to its final disposal. Such ponds permit the biological oxidation of organic material by natural or artificially accelerated transfer of oxygen to the water from the ambient air. During the bio-oxidation process, the solids in the wastewater are biologically degraded to some extent and ultimately settle to the bottom of the pond, where they may become anaerobic and be further stabilized. Periodically the pond may be drained and the settled sludge dredged out to renew the volumetric capacity of the pond for further wastewater treatment, and the withdrawn sludge is utilized for example for landfill. Oxidation ponds thus represent a functionally simple system for wastewater and sludge treatment. The use of oxidation ponds, however, has limited utility, since their operation requires sizable land areas. Moreover, no significant reduction of the level of pathogens in the sludge is accomplished by this treatment and disposal method.

Anaerobic digestion has generally been the most extensively used digestion process for stabilizing concentrated organic solids, such as are removed from settling tanks, biological filters and activated sludge plants. In common practice, the excess sludge is accumulated in large domed digesters where the sludge is fermented anaerobically for 20–30 days. The major reasons for commercial acceptance of anerobic sludge digestion are that this method is capable of stabilizing large volumes of dilute organic slurries, results in low biological solids (biomass) production, produces a relatively easily dewaterable sludge and is a producer of methane gas. Additionally, it has been variously alleged that anaerobic digestion produces a pasteurized sludge. Even though this pasteurizing capability of anaerobic digestion is questionable, anaerobic digestion is widely used in practice because it reduces the solid residue to a reasonably stable form which can be discarded as land fill without creating a substantial nuisance. The anaerobic digestion is characteristically carried out in large scale tanks which are more or less thoroughly mixed, either by mechanical means or by the recycling of compressed digester gas. Such mixing rapidly increases the sludge stabilization reactions, by creating a large zone of active decomposition.

As indicated above, anaerobic digestion has commonly been practiced with long retention times on the order of 20 – 30 days, without any heat input to the system. It has been found by the prior art that elevated temperatures in the mesophilic range of 30° to 40° C. facilitate reduction of the retention time requirement, to about 12 – 20 days. Such reduction in treatment time is a consequence of the fact that the rate of activity of the organisms responsible for digestion is greatly influenced by temperature, and that in the 30° to 40° C. temperature range highly active mesophilic microorganisms are the dominant microbial strain in the sludge undergoing digestion. The best temperatures for mesophilic digestion are in the range of about 35° to 38° C., with minimum retention times on the order of 12 – 15 days. Temperatures up to 35° C. increase the rate of digestion and may allow shorter retention times, but at the expense of system operating stability while temperatures below 35° C. require longer retention times.

Methane gas is produced during anaerobic digestion and is characteristically used in combustion heaters to offset heat losses of the anaerobic digestion system operating at elevated temperature. However, seasonal temperature variations and fluctuations in the suspended solids level of the influent sludge have a significant effect on both the methane gas production and the amount of heating which is necessary to maintain the digestion zone at the desired elevated temperature operating level. As a result, if elevated temperature conditions are to be maintained year round in the anaerobic digestion zone, an auxiliary heat source is generally an essential apparatus element of the sludge digestion system.

Since the rates of anaerobic digestion and resultant methane gas formation are strongly influenced by the suspended solids content of the sludge undergoing treatment and by the temperature level in the digestion zone, it is in general desirable to feed as concentrated a sludge as possible to the digester, thereby minimizing heat losses in the effluent stabilized sludge stream discharged from the anaerobic digester while maximizing methane production in the digester. However, even with such provisions elevated temperatures are difficult to maintain economically in the anaerobic digestion zone, especially during winter months. Furthermore, even comparatively small temperature fluctuations in the anaerobic digestion zone may result in disproportionately severe process upset and souring of the digester contents, as is well known.

In the anaerobic digestion process, the sludge solids being treated undergo essentially three distinct sequential treatment phases: first, a period of solubilization, secondly, a period of intensive acid production (acidification), and finally, a period of intensive digestion and stabilization (gasification). Each of these steps is characterized by the production of various intermediate and end products in the digestion zone. Under normal operating conditions, all three phases occur simultaneously. The primary gases produced during the final gasification phase are methane and carbon dioxide, which normally form more than 95% of the gas evolved, with 65–70% comprising methane. Production of methane gas in anaerobic digestion results from the breakdown of many compounds by numerous interdependent biochemical reactions which take place in an orderly and integrated fashion. The complex organic species in the sludge are converted by a variety of common bacteria called acid-formers to volatile acids and alcohols, without production of methane. These products from the acid-forming phase are then converted to methane gas by another variety of bacteria known as methane-formers.

The facultative acid-forming bacteria utilized in anaerobic digestion are hardy and highly resistant to process changes in their environment. Methane-forming bacteria, on the other hand, require anaerobic conditions and are extremely sensitive to process changes in their environment. For such reasons, oxygen should not be present in the anaerobic digestion zone. The inadvertent introduction of air to the digester will adversely affect methane fermentation, as well as creating a potentially hazardous situation due to combination of the combustible methane gas with oxygen. In addition, methane-forming bacteria are sensitive to such process conditions to pH variations and presence of detergents, ammonia and sulfides. In this respect, temperature stability of the anaerobic digestion zone is particulary important. The methane-formers necessary in the digestion process are highly susceptible to temperature fluctuations, which decrease their activity and viability, resulting in excessive relative growth of acid-formers. This in turn results in inadequately stablized sludge and a sludge product which is unsuitable, without further treatment, for landfill or similar disposal. Further, these methane-formers have a relatively low rate of growth and such factor necessitates the long retention times employed for anaerobic digestion even at mesophilic temperatures. Due to this low growth rate, there is danger of washing the methane-forming organisms out of the digester if the sludge solids retention time therein is reduced beyond the previously described retention time lower limits. Inasmuch as the anaerobic digester thus requires long retention times to insure the presence of adequate methane-formers and the influent sludge flow rate to the digestion zone is in general quite low, the tankage requirements for the digester are very large. Operation at elevated temperature is thus difficult, requiring large inputs of heat to the digester together with close control of the digester temperature level. As previously discussed, the prior art, faced with these considerations, has utilized the methane produced by the anaerobic digestion process as heating fuel for the digester, to maintain constant elevated temperature even under extreme ambient temperature fluctuations. Such use of methane has proven effective in minimizing the large heating energy requirements of the process.

As an alternative to the foregoing methods, biodegradable sludge can be digested aerobically. Air has commonly been employed in practice as the oxidant for this purpose. It is known that aerobic digestion proceeds more rapidly at elevated temperatures. As temperature rises from 35° C., the population of mesophilic microorganisms decline and thermophilic forms increase. The temperature range of 45° C. to 75° C. is often referred to as the thermophilic range where thermophils predominate and where most mesophils are extinct. Above this range, the thermophils decline, and at 90° C., the system becomes essentially sterile. Because of the more rapid oxidation of sludge, thermophilic digestion achieves more complete removal of biodegradable volatile suspended solids than the same period of digestion at ambient temperature. A more stable residue is obtained which can be disposed of without nuisance. It is also established that thermophilic digestion can effectively reduce or eliminate pathogenic bacteria in the sludge, thereby avoiding the potential health hazard associated with its disposal.

When diffused air systems are used to supply oxygen for digestion, with the air being passed through the body of sludge in a digestion tank and freely vented to the atmosphere, the loss of heat from the sludge to the air being passed through the digester tends to become substantial in magnitude. As a result, aerobic digestion using air has heretofor typically involved digestion with mesophilic microorganisms. Air systems in general are not employed to carry out thermophilic digestion, unless a substantial level of heating energy is readily available for maintaining temperature of sludge in the digester in the thermophilic range. Such situation may for example exist if the digestion system is located in close physical proximity to a power generating plant which produces a large quantity of waste heat, so that such heat energy is in essence "free" for use in the digestion facility. Air contains only 21% oxygen and only about 5–10% of the oxygen content thereof is dissolved. As a result, a very large quantity of air must be used to supply the oxygen requirements, and the sensible heat of the "spent" air and the latent heat required to saturate the spent air with water vapor are substantial. As a result of these heat losses in air digestion, autothermal heat effects are generally minor, and very large quantities of external heat are needed to sustain temperatures at beneficial levels.

It is known that the heat losses in aerobic digestion can be greatly reduced by using oxygen-enriched gas rather than air. If the oxygen is utilized effectively, the amount of gas which must be fed to and vented from the digester is considerably smaller compared to air, because much or all of the nitrogen has been preliminarily removed. Heat losses due to sensible warmup of the gas and to water evaporation into the gas are decreased. These reductions in heat losses are sufficient for autothermal heat alone to sustain temperature at levels appreciably higher than ambient, so that the digestion zone is able to operate efficiently in the thermophilic temperature regime with little or no input of external heat to the process. Since thermophilic stabilization is much more rapid than mesophilic stabilization, the necessary residence time in the aerobic digestion zone is greatly reduced in the thermophilic mode. This in turn permits the use of smaller basins which further reduces heat losses to the surroundings. Because of the faster rate of oxidation of sludge, thermophilic aerobic digestion can achieve suitably high biodegradable volatile solids reduction, as for example, 80-90% reduction levels, in comparatively short sludge retention periods on the order of 3 to 10 days.

Despite its substantial attractiveness, thermophilic aerobic digestion has several associated disadvantages relative to anaerobic digestion. First, since the thermophilic aerobic digestion process is oxidative in character, the process produces a bio-oxidation reaction product gas containing carbon dioxide and water vapor which have no end use utility but rather are desirably vented to the atmosphere. By contrast, anaerobic digestion produces methane gas as a reaction by-product which may be exported from the treatment facility and is also useful as a fuel gas for satisfying the heating energy requirements associated with digestion at elevated temperatures. In addition, the aerobic digestion zone requires a much greater energy expenditure, for mixing and gas-sludge contacting, than is required in the anaerobic digestion system for mixing of the digester contents.

Accordingly, it is an object of the present invention to provide an improved process for digestion of sludge.

It is another object of the invention to provide a sludge digestion process employing aerobic digestion and anaerobic digestion at elevated temperature, in a manner which utilizes the advantages of each while minimizing their attendant disadvantages.

Other objects and advantages of this invention will be apparent from the ensuing disclosure and appended claims.

SUMMARY OF THE INVENTION

This invention relates to a process for warm digestion of sludge, utilizing aerobic and anaerobic digestion.

Briefly, the sludge digestion process of this invention comprises introducing the sludge and aeration feed gas comprising at least 20 percent oxygen (by volume) to a first digestion zone and mixing same therein in sufficient quantity and rate for aerobic digestion of the sludge while maintaining total suspended solids content (MLSS) of the sludge at least at 20,000 mg/l and temperature of the sludge in the range of from 35° to 75° in the first digestion zone.

The foregoing aerobic digestion is continued for sludge retention time (duration) of from 4 to 48 hours to partially reduce the biodegradable volatile suspended solids content of the sludge introduced to the first digestion zone, with partially stabilized sludge being discharged from the first digestion zone. This discharged partially stablized sludge is then anaerobically digested in a covered second digestion zone while maintaining temperature of the sludge therein in the range of from 25° to 60° C. for sufficient sludge retention time (duration) to further reduce the biodegradable volatile suspended solids content of the sludge, to less than about 40% of the biodegradable volatile suspended solids content of the sludge introduced to the first digestion zone, and form methane gas. Further stabilized sludge and the methane gas are discharged from the second digestion zone.

As used herein, the term "sludge" means a solids-liquid mixture characterized by a solids phase and an associated liquid phase, in which the solids are at least partially biodegradable, i.e., capable of being broken down by the action of living microorganisms. Biodegradable sludges are generally characterized according to their biodegradable volatile suspended solids content (BVSS) and also by their volatile suspended solids content (VSS), with the latter parameter including both biodegradable and non-biodegradable volatile suspended solids. As used herein "biodegradable volatile suspended solids content" is essentially the maximum reduction in solids achievable by aerobic digestion of the sludge, as carried out by aerating the sludge with oxygen-containing gas at ambient temperature, e.g., 20° C. Maximum reduction of solids is assumed to be reached after 30 days aeration. Specifications for such determination are contained in "Water Pollution Control", Eckenfelder, W. W. and Ford, D. L., The Pemberton Press, 1970, page 152. By determining VSS levels for the fresh sludge and again for 30 days aeration, the biodegradable fraction of the total VSS may be calculated as:

[VSS(Fresh) − VSS(30 days)]/VSS(Fresh)

As used herein "volatile suspended solids content" of a sludge means the volatile content of the sludge solids as determined in accordance with tests 224A and 224B in "Standard Methods for the Examination of Water and Wastewater", Thirteenth Edition (1971), published jointly by American Public Health Association, American Water Works Association, and Water Pollution Control Federation, pages 535–536. The term "stabilized sludge" refers to sludge having a reduced biodegradable volatile suspended solids content subsequent to and as a result of digestion treatment. "Sludge retention time" as used herein means the average duration of time in which the sludge is contained in a given digestion zone, as calculated by the following formula:

$$\tau = V_d/Q_s$$

where $\tau$ = sludge retention time (days, or hours);

$V_d$ = volume of sludge in the digestion zone undergoing treatment, (ft³); and $Q_s$ = volumetric flow rate of sludge fed to the digestion zone, (ft$^3$/day, or ft$^3$/hr).

As used herein, the term "aerobic digestion" means the biodegradation of sludge solids as carried out under the action of aerobic microorganisms. Such mode of digestion requires that oxygen be dissolved in the liquid phase of the sludge, so as to be accessible to microorganisms in the sludge, in sufficient quantity and rate so that the oxygen requirements for biodegradation are met. As used herein, the phrase "mixing sludge and aeration feed gas in sufficient quantity and rate for aerobic digestion of the "sludge' means either oxygenation of the sludge at a rate which is equal to at least 10% of the empirically determined specific oxygen uptake rate (SOUR) value, as determined by the procedure set forth hereinafter, or sludge oxygenation with the relative quantities of aeration feed gas and sludge and rate of aeration being sufficient to obtain utilization of at least 0.03 lbs. of oxygen per lb. of volatile suspended solids in the sludge introduced to the first digestion zone, or any suitable alternative quantification of the sludge/aeration feed gas contacting step which is sufficient to insure the existence of aerobic digestion in the firstdigestion zone, in accordance with the definition of aerobic digestion set forth hereinbelow.

In terms of the specific oxygen uptake rate, the sludge oxygenation requirements necessary for aerobic digestion may suitably be fixed in accordance with the following procedure, which is readily adaptable as a bench-scale method of identifying the sludge oxygen demand. The sludge to be treated is flowed through a small-scale test vessel at sufficient volumetric flow rate to obtain the predetermined sludge retention time selected for the aerobic digestion operation, which for th aerobic digestion step of the instant invention is in the range of 4 to 48 hours, while contacting the sludge with an aeration gas containing at least 50 percent oxygen (by volume). The aeration is carried out so as to maintain a dissolved oxygen concentration (D.O.) of at least 2 mg/l in the sludge, as measured by any suitable D.O. probe of conventional type. During the aeration, sludge in the test vessel is maintained at the predetermined temperature selected for the aerobic digestion operation, which for the aerobic digestion step of the instant invention is in the range of 35° to 75° C. The foregoing test treatment of sludge, which may require dilution of the influent sludge to the test vessel with tap water in order to obtain the required D.O. level of at least 2 mg/l, is conducted until steady-state operation is achieved, which may require an extended period of operation of the test system as for example on the order of 5–7 days.

Upon the achievement of steady-state operation in the test system, a measured sample volume of sludge is withdrawn from the test vessel and, while maintained at the same temperature as preveiously existing in the test vessel, is rapidly aerated, as for example by intense agitation contacting of the sludge with aeration gas containing at least 50 percent oxygen (by volume), so as to raise the D.O. level of the aerated sludge to about 7.0 mg/l. At the point at which the D.O. level of approximately 7.0 mg/l is reached, aeration of the sample volume of sludge is terminated. Thereafter, during the subsequent decay of D.O. level in the sludge from the value of approximately 7.0 mg/l existing at the termination of aeration down to substantially negligible D.O. level, the time which is required for the D.O. to drop from a value of 6.0 mg/l down to 1.5 mg/l is measured.

The oxygen uptake rate (OUR) of the sample volume of sludge is then computed by dividing the change in D.O. level during the period of measurement, i.e., 4.5 mg/l (=6.0 mg/l−1.5 mg/l), by the time which was required for the D.O. level to decline from 6.0 mg/l to 1.5 mg/l. From the resulting OUR value, the specific oxygen uptake rate (SOUR) is calculated by dividing the OUR value, having units of mg/l/time, by the solids concentration of the sample volume of sludge, in mg/l. The SOUR value as thus calculated has units of mg oxygen/time mg solids.

Based on the foregoing calculation of the SOUR parameter for the sludge to be treated, the quantity and rate of oxygen transfer from the oxygen-containing aeration gas to the sludge in the aerobic digestion step of the instant process can be established. In order to satisfy the respiration (oxygen consumption) requirements of the sludge for aerobic digestion, as based on considerations of obtaining adequate stabilization of sludge in the aerobic digestion step prior to the subsequent anaerobic digestion step, the oxygenation of sludge in the first digestion zone in the instant process should be carried out at a rate which is equal to at least 10% of the empirically calculated SOUR value. In preferred practice, such oxygenation of sludge should be carried out at a rate which is equal to at least 50% of the empirically calculated SOUR value.

Alternatively, based on considerations of the quantity of oxygen which is required to biodegrade a unit quantity of volatile suspended solids in a given sludge, as determined for sludges of various characteristics, the mixing of sludge and oxygen-containing aeration feed gas to carry out aerobic digestion in the first digestion zone in the instant process should be conducted with the relative quantities of aeration feed gas and sludge and rate of aeration being sufficient to obtain utilization, i.e., uptake by the sludge, of at least 0.03 lbs. oxygen per lb. of volatile suspended solids in the sludge introduced to the aerobic digestion zone. The minimum value of such contacting radio is associated with a threshold level of aerobic digestion which is necessary to insure adequate stabilization of sludge in the first digestion step of the instant process prior to the subsequent anaerobic digestion step thereof. As a practical matter, it is generally desirable to conduct the sludge oxygenation with the relative proportions of sludge and aeration feed gas and rate of aeration being sufficient to obtain utilization by the sludge of from 0.1 to 0.35 lbs. oxygen per lb. of volatile suspended solids in the sludge introduced to the aerobic digestion zone. Such gas-to-sludge contacting ratios generally permit the volatile suspended solids content of the sludge introduced to the first digestion zone in the instant process to be aerobically reduced by from about 5 to 20% in the first digestion zone. In general, the volatile suspended solids content of the sludge entering the aerobic digestion zone is desirably reduced by at least 5% therein in order to produce a sufficiently partially stabilized sludge for passage to the subsequent anaerobic digestion step. Such minimum level of partial stabilization in particularly desirable so that the anaerobic digestion step is adequately "buffered" by the aerobic digestion step against process upsets, deriving from the changes in the character of the sludge entering the overall process system. On the other hand, the reduction of the volatile suspended solids content of the feed sludge introduced to the aerobic digestion zone, in the course of treatment in such zone, is desirably maintained at a level of about 20% or less in order to fully realize the synergistic advantages of this invention. Such advantages are discussed more fully hereinafter and include an unexpectedly high net production of methane gas from the anaerobic digestion second step relative to a conventional anaerobic digestion process system. As a balance of the foregoing considerations, the aeration feed gas and sludge mixing operation in the first digestion zone should most preferably be conducted with the relative quantities of aeration feed gas and sludge and rate of aeration being sufficient to obtain utilization by the sludge of from 0.15 to 0.25 lbs. oxygen for each lb. of volatile suspended solids in the sludge introduced to the first digestion zone.

As used herein, the term "anaerobic digestion" means the biodegradation of sludge solids as carried out in the absence of free oxygen. The present invention is based on the surprising discovery that an aerobic digestion zone operating in the thermophilic or near-thermophilic temperature regime may advantageously be integrated with a downstream anaerobic digestion zone to provide partial digestion of sludge in each of the sequential zones, and that such integration provides substantial process improvement beyond that which would be expected based on consideration of the respective digestion steps in the treatment process taken separately, as shown more fully hereinafter.

The prior art has not sought to combine elevated temperture aerobic and anaerobic digestion of sludge in the manner contemplated by the present invention for numerous reasons. First, the tankage associated with the anaerobic digestion process, as discussed earlier herein, is extremely large and it has been found necessary to produce large amounts of methane for heating fuel to insure economic operation of the huge digestor tanks. The combination of an anaerobic digester with an aerobic digestion step would thus appear undesirable due to considerations of overall tankage requirements for the combined process, which one would expect to be larger than the tankage associated with either digestion process alone. Such combination thus appears on its face to merely duplicate the functions normally associated with each of the aerobic and anaerobic digestion processes, at an increased cost of equipment without expected benefit in treatment efficiency.

Furthermore, the combination of an anaerobic digester with an aerobic digestion step would appear undesirable due to the expected inability of the anaerobic digestion step to provide only partial digestive treatment of sludge in the combined system, at sludge retention time levels less than the long retention times characteristic of conventional anaerobic digesters operating alone. As discussed earlier herein, long retention times are necessary in the anaerobic digestion step to obtain efficient methane production and sludge stabilization. If anaerobic retention time were reduced below its normal full-treatment level in a combined aerobic/anaerobic digestion process, so as to secure only partial digestion in the anaerobic step, one would expect an excessive depletion of the methane-formers in the short retention time anaerobic step, by loss of these slow-growing species in the effluent from the digester, with resulting inadequacy of sludge stabilization in the combined process.

In addition to the foregoing reasons, the combined aerobic/anaerobic digestion system would appear disadvantageous from the standpoint of operating stability, since each of the aerobic and anaerobic digestion steps alone requires close operating temperature control when operating at elevated temperature levels, so that coupling of the two respective processes would appear to require still tighter temperature control with a potential for increased adverse effect from temperature instability and fluctuation.

Finally, a combined aerobic/anaerobic digestion system would appear to be disadvantageous based on a consideration of potential carryover of residual dissolved oxygen from the upstream aerobic step to the downstream anaerobic segment of the process. As indicated hereinabove, methane-forming bacteria present in the anaerobic digestion zone are strictly anaerobic in character and are extremely sensitive to changes in their environment. It is well established that any significant introduction of oxygen into the anaerobic digestion zone will adversely affect sludge stabilization by methane formation and create the danger of evolution of oxygen from the liquor to the methane-containing gas phase and formation of a combustible gas mixture in the digester.

In contrast to the foregoing anticipated behavior, it has unexpectedly been found that the deployment of a thermophilic or near-thermophilic aerobic digestion zone upstream of a mesophilic or thermophilic temperature anaerobic digestion zone and operation of these respective zones in accordance with the process of the present invention not only provides an operable and economic sludge treatment system but results in a digestion system with unique overall process improvements relative to prior art processes, due to the synergism which is achieved between the aerobic and anaerobic digestion segments in the instant process. For example, the process of the instant invention is able to provide a thermal operating stability in the overall sludge digestion system which it is not possible to achieve in either constituent digestion step operating alone. Furthermore, the integrated digestion process according to the present invention produces a highly stabilized sludge, despite a marked reduction in sludge retention time for the overall process beyond that which would be expected based on the anticipated additive retention time requirements for the constituent partial digestion steps. Particularly surprising in this respect is the finding that the anaerobic digestion zone in this process is able to operate at sludge retention time levels substantially less than are required for full stabilization treatment of sludge in conventional anaerobic digesters operating alone, and that such operation is achieved without loss of utility or treatment efficiency such as would be expected. As an example of retention times suitably employed under the invention, a pilot plant system embodying the instant process has been satisfactorily operated with a sludge retention time in the aerobic first step of 24–48 hours and a retention time in the anaerobic second step as low as 4–5 days. The foregoing advantages are realized in the present invention along with a substantial reduction in system tankage requirements relative to a conventional anaerobic digester system, but with retention of an unexpectedly large portion of the methane production capacity of the conventional anaerobic digester taken alone, as will be shown in greater detail hereinbelow. However, by way of example, the system of the present invention may employ about 60% of the tankage required by a prior art anaerobic digestion system, yet retain approximately 75 percent of the methane production capacity of the latter. The instant process yields substantially greater production of methane than is required for process heating fuel requirements, with the result that a significantly larger amount of high methane-content off gas is available for export from the sludge digestion facility relative to the prior art anaerobic digestion system. Finally, no significant carryover of oxygen from the first digestion zone to the gas phrase in the second digestion zone has been found to occur in the instant process.

The reasons for the unexpected advantages of this invention, as described above, are not fully understood. It is probable, however, that the absence of significant carryover of oxygen from the first digestion zone to the second is due to the unexpectedly high oxygen uptake rate of the sludge in the first digestion zone which serves to rapidly and thoroughly deplete any dissolved oxygen content in the sludge passed from the first to the second digestion zone, before any appreciable evolution of dissolved oxygen to the gas phase in the second digestion zone can occur. The striking low sludge retention times in the instant process, particularly in the anaerobic digestion step, together with the thermal stability characteristic of the process and the unexpectedly high methane production capacity of the anaerobic step, may be a consequence of a chemical or biological acclimatization of the sludge and microorganisms in the aerobic digestion zone which provides enhancement of efficiency of the subsequent anaerobic treatment step. Nonetheless, we do not wish to be bound by any particular theory by way of explanation of such performance behavior and, accordingly, the foregoing should not be construed in any limiting manner as regards the present invention, subject only to the essential steps and features disclosed and claimed herein.

DESCRIPTION OF THE PREFERRED EMBODIMENTS

Figure 1:
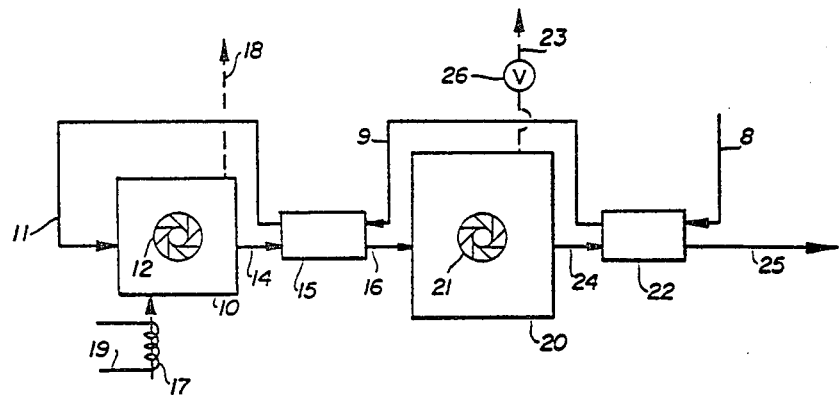
FIG. 1 is a schematic flowsheet of a digestion process according to one embodiment of the instant invention, wherein heat is recovered from the effluent streams from each of the first and second digestion zones.

Referring now to FIG. 1, a schematic flowsheet of a process according to one embodiment of the instant invention is shown such as is suitable for sludge treatment with a thermophilic or near-thermophilic aerobic first digestion step followed by mesophilic anaerobic digestion. Sludge, which may derive from a source such as a primary sedimentation tank, the clarifier in an activated sludge wastewater treatment plant, or a trickling filter, or from some other sludge-producing system, enters the process in line 8 and is sequentially heated in heat exchangers 22 and 15, as for example to a temperature of 30°–35° C., prior to introduction to the first digestion zone 10, to maintain the temperature in the zone in the range of from 35° to 75° C., and preferably in the thermophilic range of from 45° to 75°. The ambient temperature sludge in line 8 is first heated in heat exchanger 22 by passage of the sludge in indirect heat exchange counter-current flow relationship with the further stabilized sludge discharged from covered second digestion zone 20 in line 24. In this manner heat is recovered from the further stabilized sludge and the resulting cooled stabilized sludge is discharged from the heat exchanger 22 and passed out of the system in line 25 to final disposal or other end use. The further stabilized sludge entering the heat exchanger 22 in line 24 may suitably be at a temperature of 35°–40° C. so that the influent sludge exiting the heat exchanger in line 9 is warmed to temperature of 28°–30° C. From line 9 the partially warmed influent sludge is further heated in heat exchanger 15 to a temperature of 30° to 35° C. by indirect countercurrent flow heat exchange with the partially stabilized sludge discharged from the first digestion zone 10 in line 14 and passed from the heat exchanger in line 16 to the second digestion zone 20.

As an alternative to the above-described heat exchange with sludge product streams from the respective digestion zones, the influent sludge may be heated prior to introduction to the first digestion zone by indirect heat exchange with a suitable externally supplied heating medium such as steam or hot water, although heat recovery from the warm digestion zone product streams is preferred since it efficiently serves to conserve heat within the process and minimizes heating energy requirements for the process. Although heating of the influent sludge prior to its introduction to the first digestion zone is not essential in the broad practice of the present invention, it may be desirable in practice to maximize the thermal efficiency of the elevated temperature process. The desirability of such heating of the sludge, as will be discussed more fully hereinafter, depends on the influent sludge solids content, sludge retention time in the aerobic digestion zone, and other process parameters.

The further heated sludge discharged from the heat exchanger 15 in line 11 is introduced to first digestion zone 10 along with aeration feed gas from line 17 as the process fluids for the first digestion step. The aeration feed gas in line 17 minimally comprises at least 20 percent oxygen (by volume), with at least 50 percent and desirably at least 80 percent oxygen content (by volume) aeration feed gas being preferred in order to provide suitable high mass transfer driving force and rate of oxygen dissolution in the sludge at the high sludge temperatures in the first digestion zone contemplated under the present invention. Line 17 is connected to a source of oxygen-containing aeration feed gas (not shown) which may for example comprise compressed air supply means or, if the aeration feed gas is, as preferred, of high oxygen content, the source for same may suitably comprise a cryoenic oxygen plant or supply vessel or an adiabatic pressure swing absorption air separation unit, as conventionally available as supply source means for enriched oxygen-containing gas. As shown, the oxygen-containing aeration feed gas in line 17 may also be heated by heater 19 to assist in maintaining the temperature in the digestion zone 10 at the desired process level.

In the general practice of the present invention, air or other aeration feed gas of low oxygen content, i.e., 20–50 percent oxygen by volume, may suitably be employed when autothermal heating of the sludge in the aerobic digestion zone is not required to maintain the temperature of sludge therein in the required range of from 35° to 75° C., such as where a large source of externally supplied heat energy is available for sludge heating to maintain the requisite high temperature in the aerobic digestion zone. As mentioned earlier herein, heat losses with air (or other low oxygen content aeration feed gas) tend to be very large, so that aeration feed gas of at least 50 percent and desirably at least 80 percent oxygen content (by volume) is preferred in order to promote autothermal sludge heating in the aerobic digestion zone while minimizing the quantity of oxygen-depleted digestion gas which is wasted from such digestion zone and which otherwise carries heat energy out of the process system. In addition, high oxygen content aeration feed gas, i.e., containing at least 50 percent oxygen (by volume), is preferred in order to increase the extent of oxygen mass transfer from the aeration feed gas to the sludge during aerobic digestion and thereby facilitate a more intense aerobic digestive action than is achievable with low oxygen content aeration feed gas. Regardless of whether high oxygen content or low oxygen content aeration feed gas (as defined above) is employed in the aerobic digestion zone of the instant process, it is generally preferred to provide the aerobic digestion zone with a cover to form a gas space overlying the sludge therein from which waste oxygen-depleted digestion gas can be vented. Such arrangement permits a controlled venting of waste gas, as for example by a small vent conduit passing through the cover and joining the gas space with the external gas environment, and thereby promotes heat retention in the aerobic digestion zone relative to an uncovered zone wherein oxygen-depleted aeration gas is allowed to pass freely in bulk from the sludge volume being treated into the external gas environment, i.e., the ambient atmosphere. In addition, where high oxygen content aeration feed gas is employed in the aerobic digestion zone, it may be desirable to provide a cover for the digestion zone to form a gas space from which the oxygen-containing aeration gas can be recirculated against the sludge as for example by recirculation of gas from the overhead gas space to a submerged sparger device, or in which the sludge can be recirculated against the aeration gas, as for example by means of a surface aeration device. Such aeration gas or sludge recirculation arrangements permit the aerobic digestion step to realize high utilization of the oxygen content in the aeration feed gas introduced to the aerobic digestion zone.

In the zerobic digestion zone 10, the sludge and aeration feed gas fluids are mixed. If the digestion zone 10 is provided with a cover and high oxygen content aeration feed gas is employed, one of the sludge and aeration feed gas fluids may desirably, as indicated above, and simultaneously with the mixing, be recirculated against the other fluid in the digestion zone in sufficient quantity and rate for aerobic digestion of the sludge while maintaining the total suspenped solids content (MLSS) of the sludge at least at 20,000 mg/l. Such mixing and fluid recirculation is suitably effected by the contacting means 12 which may in practice comprise a submerged turbine sparger and a gas compressor, with the latter coupled to the gas head space in the digestion zone and to the gas sparger, for recirculation of the oxygen-containing aeration gas against the sludge, or, alternatively, the contacting means may comprise a surface aeration device for recirculating sludge against aeration gas in the gas head space of digestion zone 10. Recirculation of one of the sludge and aeration gas fluids against the other fluid in the aerobic digestion zone may, as indicated above, be desirable in practice where high oxygen content aeration feed gas is employed in order to obtain high levels of oxygen dissolution in the sludge and high utilization of the oxygen contained in the aeration feed gas. Nonetheless, such recirculation is not essential in the broad practice of the present invention and in some instances it may be possible to obtain adequate dissolution of oxygen in the sludge and high utilization of oxygen in the aeration feed gas with a once-through flow of aeration feed gas through the aerobic digestion zone. The relative proportions of aeration feed gas and sludge to be contacted in the first digestion zone for aerobic digestion therein may suitably be established in the manner disclosed in the preceding Summary section herein, as based for example on an empirical determination of the specific oxygen uptake rate (SOUR) of the sludge to be treated, or on the basis of the amount of oxygen which is required to biodegrade a unit quantity of volatile suspended solids in such sludge. In some systems, it may be desirable to insure the existene of intense aerobic digestive action in the first digestion zone by the maintenance of high dissolved oxygen (D.O.) levels in the sludge therein, as for example at least 2 mg/l, but in general, the oxygen uptake rate of sludge in the first digestion zone of the instant process is sufficiently high so that maintenance of a substantial D.O. level in the sludge being oxygenated is not necessary for efficient aerobic digestion.

In the aerobic digestion zone, the total suspended solids content (MLSS) of the sludge is maintained at least at 20,000 mg/l so as to facilitate the maintenance of high sludge temperature in the first digestion zone, as necessary to obtain a satisfactory degree of partial sludge stabilization in the aerobic digestion zone at short retention times.

Under the foregoing process conditions, sludge is maintained in the first digestion zone for digestion at a temperature in the range of from 35° to 75° C., and preferably in the thermophilic range of from 45° to 75° C., for rapid biodegradation of the sludge volatile suspended solids content. In this respect, it is to be appreciated that aerobic digestion in the near-thermophilic temperature range of 35° to 45° C. may suitably be employed in the broad practice of the present invention to achieve solids degradation rates which, while not as rapid as the rates characteristic of thermophilic operation, are sufficiently high to achieve adequate sludge stabilization at the low sludge retention time values characteristic of the first digestion step in the instant process.

The aerobic digestion step is continued in the first digestion zone for sludge retention time of from 4 to 48 hours, to partially reduce the biodegradable volatile suspended solids content of the sludge introduced to the first digestion zone. As indicated earlier herein, the aerobic digestion step is preferably conducted so as to reduce the volatile suspended solids content of the sludge introduced to the first digestion zone by from 5 to 20 percent, for the reasons previously set forth. In the aerobic digestion step, the sludge retention time should be at least 4 hours in order to obtain a sufficient extent of partial stabilization in the first digestion zone; at retention times below 4 hours, the extent of sludge stabilization required in the subsequent anaerobic treatment step becomes disproportionately large relative to the stabilization level in the aerobic first step and the overall system retention time and tankage requirements begin to approach those of the conventional anaerobic digestion system, with increasing loss of the unexpected improvement in these process variables (i.e., overall system retention time and tankage) characteristic of operation at retention times in the aerobic digestion step of from 4 to 48 hours. For correspondingly similar reasons, the sludge retention time in the aerobic digestion zone should not exceed 48 hours. Above such values, the extent of sludge stabilization in the aerobic digestion zone becomes unduly large with regard to the residual stabilization in the downstream anaerobic step, so that methane production in the latter step tends to be seriously adversely reduced, and again there is increasing loss of the unexpected improvement of the overall system retention time and tankage requirements achievable in connection with the aerobic digestion sludge retention time range of from 4 to 48 hours. Preferably, the retention time is in the range of from 12 to 30 hours, and suitably from 12 to 24 hours, based on the foregoing considerations.

Following the above-described aerobic digestion treatment, partially stabilized sludge is discharged from the aerobic zone in line 14 and oxygen-depleted digestion gas is separately discharged from the aerobic zone in line 18. In the case where aeration feed gas containing at least 50 percent oxygen (by volume) is introduced to the first digestion zone, the oxygen-depleted digestion gas discharged therefrom desirably contains at least 21 percent oxygen (by volume) in order to obtain suitably high utilization of oxygen contained in the aeration feed gas while maintaining the expenditure of energy for aeration gas and sludge contacting at a suitably low level for economic operation. In order to insure high oxygen utilization, particularly when using high oxygen content aeration feed gas, the oxygen purity level of the digestion zone vent in line 18 may readily be maintained at an appropriate level by suitable regulation of the relative rates of aeration gas introduction via line 17 and venting in line 18, as for example by gas flow control valves in either of the inlet or vent gas lines, coupled in controlled relationship with an oxygen purity analyzer (not shown) disposed in the vent line 18, in a manner well known to those in the art.

It has been found that by maintaining the sludge in the aerobic digestion zone of the present invention at a thermophilic temperature of at least about 50°–52° C., substantially complete pasteurization of the sludge is achieved. In the broad practice of the present invention, partially stabilized sludge is discharged from the aerobic zone 10 in line 14 at temperature in the range of between 35° C. and 75° C. Inasmuch as this specific embodiment of the invention employs mesophilic anaerobic digestion in the covered second digestion zone 20, heat may desirably be removed from the partially stabilized sludge in line 14 to ensure efficient operation of the anaerobic sludge treatment step at a lower temperature than that employed in the first digestion zone 10. Accordingly, the sludge in line 14 is flowed through the heat exchanger 15 in indirect heat exchange relationship with the partially warmed influent sludge entering heat exchanger 15 in line 9. The cooled partially stabilized aerobically treated sludge then flows through line 16 for introduction to the covered second digestion zone 20.

Alternatively, the partially stabilized sludge in line 14 could be cooled by an externally supplied cooling medium such as the clarified effluent of a wastewater treatment plant. Additionally, in winter operation, there may be no need to utilize a heat exchange step such as carried out by heat exchanger 15 for cooling of the partially stabilized sludge stream, since heat losses to the environment from the second digestion zone and the sludge stream flowing from the first to the second digestion zone may satisfactorily compensate for the absence of such heat exchanger.

The partially stabilized sludge introduced to the second digestion zone from line 16 is maintained therein under anaerobic conditions at temperature of from 25° to 45° C. for sufficient sludge retention time (duration) to further reduce the biodegradable volatile suspended solids content of the sludge, to less than about 40%, and preferably less than 20%, of the biodegradable volatile suspended solids content of the sludge introduced to the first digestion zone, and form methane gas.

In the road practice of the present invention the temperature of the sludge in the covered second digestion zone is maintained in the range of 25° to 60° C., which includes both operation in the mesophilic range of 25° to 45° C. and operation in the thermophilic range of 45° to 60° C. For highly efficient operation, the anaerobic zone in mesophilic operation is maintained at a sludge treatment temperature of between 35° C. and 40° C., and preferably between 37° C. and 38° C. A preferred operating temperature range for anaerobic themophilic digestion is from 45° to 50° C.. Operation in the foregoing preferred temperature ranges provides particularly rapid degradative action of biodegradable volatile solids by the microbial strains involved.

In the operation of the anerobic digestion zone 20, the digestion zone contents are advantageously continuously mixed by agitation means 21, thereby creating a large zone of active decomposition and significantly increasing the rate of the stabilization reactions. Retention time of the sludge in the second digestion zone may suitably lie in the range of from 4 to 12 days and preferably in the range of from 5 to 9 days. Sludge retention times in the second digestion zone of less than 4 days may be undesirable because below such value, the retention time tends to become increasingly inadequate to support a large viable population of methane formers in the anaerobic step, which consequent adverse effect on the overall sludge stabilization performance of the digestion system. On the other hand, at sludge retention times in the anaerobic digestion step of greater than 12 days, the retention time for the second digestion zone becomes superfluously long, and the synergistic retention time and tankage requirement benefits realized by the integrated process of the invention in the broad retention time range of 4–12 days become increasingly difficult to achieve.

After anaerobic treatment of the sludge in the second digestion zone 20 is complete, the further stabilization sludge produced thereby is discharged from the second digestion zone in line 24 and heat exchanged for recovery of heat content against the influent sludge feed in heat exchanger 22 prior to final discharge from the process in line 25. The methane gas formed in the second digestion zone 20 as a product of the biochemical reactions conducted therein is discharged from the anaerobic treatment step in line 23 having flow control valve 26 disposed therein.

As discussed earlier herein, continuous operation of a high rate anaerobic digester at optimum above-ambient temperatures has been inherently difficult to maintain in conventional practice. Ambient temperature fluctuations typically cause variation in both the temperature of the influent sludge and the heat leak of the digester tank, which in turn results in undesirabl temperature fluctuations within the digestion tank. Such variations in temperature, as discussed, influence the relative growth rates of the acid-forming and methane-forming bacteria. The acid-forming bacteria are typically very hardy and moderate temperature fluctuations do not alter their metabolic activity to any significant degree. Methane-forming bacteria, on the other hand, are extremely sensitive to environmental conditions. If the maintenance of constant temperature in the anaerobic digestion zone is upset by even minor temperature fluctuations, instability in the activity and growth of the methane-formers will be likely to result. In consequence, the activity of the acid-formers will dominate with an attendant accumulation of the acidic intermediate products of decomposition and lowering of the pH level in the digestion zone. As the pH drops, the activity of the methane-formers is further reduced and a severe upset to the process is brought about.

The solution attempted for the above-described process upset condition in the conventional anaerobic digestion zone generally involves the addition of large quantities of lime to the digester in order to increase the buffering, and thereby raise the pH level in the digester. By increasing the pH and decreasing the influent feed rate, it is sometimes possible to bring the digester experiencing such upset back into operation. This corrective measure, however, is in general only suitable in the case of short-term fluctuations or process upsets and is not usually advantageous in the case of long-term fluctuations or upset conditions.

In the process of the present invention, control and maintenance of elevated digestion zone operating temperature with minimal temperature fluctuations regardless of climatic conditions is achieved through the integration of a thermophilic or near-thermophilic aerobic digestion step with a subseqent anaerobic sludge treatment step. In the process of this invention, the thermophilic or near-thermophilic aerobic digestion step is generally capable of furnishing more than enough heat to thermally stabilize the anaerobic step, by virtue of the heat content of the partially stabilized sludge stream which is flowed from the anerobic digestion zone to the anaerobic step. As a result, temperature upsets in the anaerobic zone of the instant process can be virtually eliminated by varying such process parameters as sludge retention time in the aerobic zone, the solids content of the sludge fed to the aerobic zone, and the amount of heat exchange warming of the feed sludge prior to its introduction to the aerobic zone.

Another substantial benefit provided by the integrated process of this invention, beyond that attributable to operating temperature stability, is its ability to accommodate a sporadic upset, such as a shock load, without loss of process efficiency. In a conventional anaerobic digestion zone not only does the initial solubilization phase of the digestion process occur rapidly, but microbial action by faculative acid-forming bacteria also occurs at a high rate. Upon the incidence of a sudden high solids loading on the conventional anaerobic digestion system, solubilization and acidification occur at a faster rate than the methane-forming bacteria can use the acidic intermediate products. As a result, accumulation of acidic constituents occurs in the digestion zone, the pH in the digestion zone falls and a souring of the digester contents is prone to occur. In the instant process, however, the upstream thermophilic or near thermophilic aerobic step promotes rapid solubilization of biodegradable species in the sludge so that upon the incidence of a shock loading to the aerobic zone a resulting rapid solubilization occurs in the aerobic digestion as well as stabilization of the most volatile portion of the sludge, thereby smoothing out the shock and greatly diminishing its effect on the downstream anaerobic zone. In the further treatment step the anaerobic zone receives a partially stabilized sludge on which the acid-forming bacteria and methane-forming bacteria can grow in balance.

Inasmuch as the aerobic digestion step in the sludge treatment process of the present invention preferably employs a thermophilic digestion zone, the process disclosed and claimed in U.S. Pat. No. 3,926,794 issued Dec. 16, 1975 to N. P. Vahldieck, incorporated herein to the extent pertinent, may advantageously be employed in conjunction with the process of the instant invention for treatment of wastewater for BOD removal therefrom by the activated sludge process and treatment of the resultant waste activated sludge by the process of this invention.

By way of background, activated sludge secondary treatment of wastewater is conventionally carried out in the following manner. BOD-containing wastewater, as for example municipal sewage, may first be subjected to treatment steps such as degritting and primary sedimentation to separate a primary sludge comprising biodegradable suspended solids from the wastewater and to thereby form solids - depleted primary effluent which then enters the secondary treatment system. In the secondary treatment, the primary effluent and recycle sludge are mixed and aerated at sufficient rate and for sufficient time to form mixed liquor of reduced BOD content. Thereafter, the mixed liquor is separated into purified liquid and activated sludge and at least a major portion of activated sludge is returned for mixing with the primary effluent as the aforementioned recycle sludge. This wastewater treatment system may suitably be employed in conjunction with the process of the invention, wherein the primary sludge and unreturned activated sludge are introduced to the first digestion zone of the instant process as the sludge feed therefor.

As taught in the aforementioned Vahldieck patent, oxygen gas is used for thermophilic digestion of activated sludge in a warm covered digestion zone and the vent gas from the digestion zone is used at least as the major part of the aeration gas in a cooler covered zone for activated sludge secondary treatment of wastewater. This patent discloses that in order to obtain the high mass transfer driving force necessary for efficient oxygen dissolution in elevated temperature aerobic digestion, relatively high purity oxygen gas should be used as aeration gas for the digestion step. At elevated temperatures, the increased rate of the biochemical degradative action on the sludge in the aerobic digestion zone produces substantial amounts of carbon dioxide as gaseous reaction product. Since the solubility of carbon dioxide is comparatively low at the high temperatures characteristic of aerobic thermophilic digestion, a significant amount of carbon dioxide evolves into the gas phase in the aerobic digester, thereby reducing the effective concentration of oxygen in the aeration gas therein.

Moreover, at high thermophilic temperatures the oxygen gas phase concentration in the digestion zone is reduced further by water vapor present in the aeration gas, due to the relatively high vapor pressure of water at such temperature levels.

Figure 2:
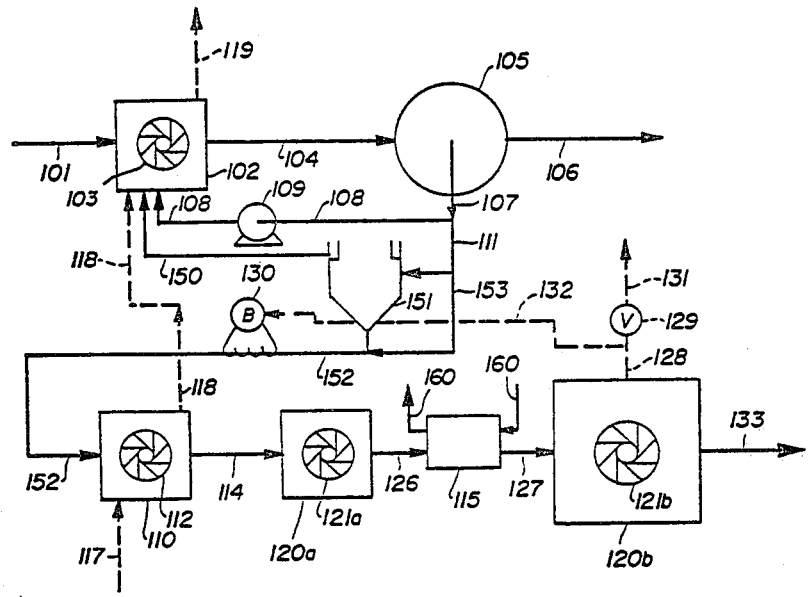
FIG. 2 is a schematic flowsheet according to another embodiment of the invention, wherein oxygen-depleted digestion gas discharged from a covered first digestion zone is utilized in secondary treatment oxygenation of BOD-containing water.

The foregoing effects substantially reduce the driving force for oxygen mass transfer from the gas phase to the sludge in the thermophilic digestion zone. The driving force for oxygen mass transfer to the liquid sludge phase is also reduced as a result of lower oxygen solubility at elevated thermophilic temperature levels. For these reasons, the Vahldieck patent teaches that the oxygen-containing gas introduced to the thermophilic digestion zone desirably has an oxygen concentration of at least 80% by volume. Under such operating constraint, the spent aeration gas from the thermophilic digestion zone can advantageously be used as the oxidant gas in an activated sludge secondary treatment system. FIG. 2 herein is a schematic flowsheet according to another embodiment of the invention, illustratively showing a manner in which the teachings of the Vahldieck patent may advantageously be employed in conjunction with the practice of the present invention.

Referring now to FIG. 2, BOD-containing water as for example sewage enters aeration zone 102 through conduit 101. First gas comprising at least 40% oxygen (by volume) enters zone 102 through conduit 118 (dotted-line) and recycled activated sludge also enter zone 102 through conduit 108 having pump 109 therein. Supernatant liquid from sludge thickener 151 is also introduced to the covered aeration zone 102 in line 150. In this Figure, liquid and sludge flow conduits are shown by solid lines whereas gas flow conduits are shown by dotted lines. For purposes of simplicity, valves are not illustrated, but the appropriate use of same in practicing the invention will be well understood by those skilled in the art. The aforementioned streams are intimately mixed in aeration zone 102 by mechanical agitation means 103. The latter may comprise motor-driven impellers located near the liquid surface or submerged below the surface, and the oxygen gas may be introduced through conduit 118 either above or below the liquid. Such apparatus is well known to those skilled in the art and should be selected to achieve high contact area between the fluids with minimal work expenditure. If the oxygen gas is sparged or diffused into the liquid, the bubbles should be small so that their total surface area is large and their buoyancy is low. Dissolution of oxygen is also aided by submerging the gas dispersion means to a depth in the liquid where the hydrostatic effect is significant.

In preferred practice, means are suitably provided for continuously recirculating one fluid against the other fluids in aeration zone 102. For example a compressor (not shown) may be joined to the gas space in the aeration zone by suitable conduit means for recirculating aeration gas to the lower portion of the zone for release as small gas bubbles through a conventional type sparger device. Alternatively, the aforementioned mixing means may also be employed for fluid recirculation as in the case of surface aeration impellers. Aerating devices are commonly rated by the so-called "air standard transfer efficiency" which identifies the capability of the device to dissolve oxygen from air into zero - DO tap water at one atmosphere pressure and 20° C. Suitable devices are those which have an air standard transfer efficiency of at least 1.5 lb. $O_2$ per HP-hr and preferably at least 3.0. For these purposes the power used in rating the device is the total power consumed both for agitating the liquor and for gas-liquor contacting.

The aforementioned oxygen is introduced and contacted with the mixed liquor in sufficient quantity and rate to maintain the dissolved oxygen content (DO) of the mixed liquor at least at 0.5 mg/l. Also, the liquor temperature is preferably maintained at least at 15° C., so that means may be needed in cold weather to prevent lower temperature in aeration zone 102, as for example means for heating the incoming wastewater in line 101. Design and operation of wastewater aeration zone 102 may be as described in any of U.S. Pat. Nos. 3,547,811; 3,547,812; or 3,547,815.

The oxygenated mixed liquor is discharged from covered aeration zone 102 and passed through conduit 104 for separation into purified supernatant liquid and activated sludge in clarifier 105. Unconsumed oxygen-containing gas is discharged from aeration zone 102 through conduit 119 and may for example be vented to the atmosphere. This gas is discharged from the aeration zone at rate controlled so that its oxygen content is no more than 40% of the total oxygen introduced to the covered aerobic digestion zone (discussed hereinafter). Returning now to clarifier 105, supernatant purified liquid is discharged through conduit 106 and activated sludge drawn off through conduit 107 containing concentrated microorganisms in the concentration of about 10,000 to 40,000 mg/l total suspended solids content (MLSS). The major part of the activated sludge, e.g., at least 85%, is returned through conduit 108 and pump 109 to the aeration zone, preferably at a flow rate relative to the BOD-containing wastewater such that the recirculating sludge/BOD containing wastewater volume ratio is 0.1 to 0.5. The flow rates into the covered aeration zone 102 are preferably such that the total suspended solid concentration (MLSS) therein is 4,000–12,000 mg/l and the volatile suspended solid content (MLVSS) is 3,000–10,000 mg/l. The liquid-solid contact time in aeration zone 102 for organic food absorption-assimilation is between 30 minutes and 24 hours. This time varies depending upon the strength (BOD-content) of the wastewater, the type of pollutant, solids level in aeration and temperature, all of which is understood by those skilled in the art.

Not all the sludge separated in clarifier 105 is returned to the aeration zone 102 for two reasons. First, the activated sludge process produces a net yield of microorganisms because the mass of new cells synthesized from impurities in the wastewater is greater than the mass of cells autooxidized during treatment. Second, the wastewater normally contains non-biodegradable solids which settle and accumulate with the biomass. Therefore, a small fraction of the activated sludge must be discarded in order to balance the microorganism population and the food (BOD) supply and in order to suppress the accumulation of inert solids in the system. Sludge wasting will usually comprise less than 3% of the total separated sludge and rarely more than 15%.

While the waste sludge is a small fraction of the total solids separated in the clarifier, it nevertheless is often a large absolute quantity of material. Regardless of quantity, its disposition represents a significant part of the cost of wastewater treatment, and in addition, poses a serious ecological problem. The sludge is putrescible and is highly active biologically, and often contains pathogenic bacteria. Potentially, the sludge is useful as fertilizer and/or land fill, but before such use, it must be well stabilized to avoid nuisance and health hazards, and its high water content (e.g. 96–98%) must be reduced.

The waste sludge from the clarifier 105 is withdrawn from the sludge recirculation loop in conduit 111, containing 10,000 to 40,000 mg/l MLSS, and initially at about the same temperature as the wastewater in aeration zone 102, e.g., 15° to 25° C., and is passed to a thickening tank 151. The thickening tank 151 concentrates the sludge to between 20,000 and 60,000 mg/l MLSS and passes the thickened sludge underflow via conduit 152 to the sludge digestion system.

In some instances, such as high ambient temperature wastewater treatment operation, and high solids concentration levels in the underflow withdrawn from the clarifier, thickening of the waste sludge from the clarifier may not be necessary and the sludge in conduit 111 may suitably by-pass tank 151 through conduit 153 and subsequently enter conduit 152 for passage to the sludge digestion system. The thickener overflow (supernatant liquid) is passed via conduit 150 to aeration zone 102, as previously described.

The thickened sludge in line 152 may be heated if necessary before introduction into aerobic digestion zone 110, by methane boiler 130. Alternatively, the sludge could be heat exchanged with the stabilized sludge effluent from the anaerobic digestion zone 120b, in a manner similar to that illustratively described earlier herein in connection with the embodiment shown in FIG. 1. Waste sludge is introduced to a covered first digestion zone 110 either continuously or intermittently from line 152. The aerobic digestion zone 110 is maintained at a temperature level in the range of from 35° to 75° C. and preferably in the thermophilic regime of from 45° to 75° C. A preferred range for autothermal operation in the aerobic digestion zone is from 50° to 65° C. The elevated temperature in the covered first digestion zone 110 can also be maintained by supplying external heat, as for example by a suitable heated fluid circulating in a heat exchange means (not shown) disposed internally in the digestion zone. Because of the coating and plugging tendency of the solids, heat transfer surfaces disposed within the digester should not be intricate or closely spaced and may advantageously be embedded in or bonded to the wall of the tank.

Second oxygen gas comprising at least 80% oxygen (by volume) is introduced to covered first digestion zone 110 through conduit 117. As discussed hereinafter, this gas is sufficient in quantity to provide part of the first oxygen gas introduced to aeration zone 102 through conduit 118.

Preferably, the elevated temperature in covered first digestion zone 110 is obtained autothermally without need for heat exchangers such as 130. The concentrated sludge which is characteristically obtained in the oxygen aeration process of U.S. Pat. No. 3,547,813 is very favorable to autothermal operation because of its reduced water content relative to its biodegradable "fuel" content. Moreover, high solids concentrations reduce digester size and hence reduce conductive heat losses through the walls of the digester tank. As previously indicated, the total suspended solids content (MLSS) of the sludge in the digestion zone should be at least 20,000 mg/l, based on such considerations.

Upper limits on aerobic digester solids concentration are generally imposed by two factors. Broadly, the maximum concentration depends upon capability of conventional sedimentation and thickening devices to reduce water content. Flotation devices, centrifugal separators, and gravity thickeners often produce 60,000 mg/l total suspended solids concentrations. Solids levels can be further increased by admixture of primary sludge or concentrated waste from a source other than the wastewater. The second factor which limits solids concentrations is the increasing difficulty in dissolving oxygen and mixing solids in the digester. A preferred upper limit is 80,000 mg/l, and most preferably 60,000 mg/l, to insure that adequate oxygenation of the sludge can be carried out without excessive power expenditure in the aeration gas and sludge mixing operation.

Digester tank construction also affects the maintenance of elevated temperature levels and concrete walls are preferred over metal because of the lower conductive heat loss through concrete. Heat loss can be further reduced by embedding the tank below grade and mounding earth against any exposed vertical wall of the tank. Thermal insulation such as low-density concrete or foamed plastic can be applied over a metal cover if required.

It is also preferable to practice the invention in aerobic and anaerobic digesters having a surface-to-volume ratio less than 0.8 ft$^2$/ft$^3$ (2.62 m$^2$/m$^3$). For these purposes, "surface" refers to the entire wall surface area of the covered digester including top, bottom and side walls. Surface-to-volume ratios larger than 0.8 result in large heat conduction losses through the walls in relation to the quantity of heat necessary to be maintained in the digester. Such heat loss is likely to necessitate thermal insulation on walls exposed to ambient atmosphere.

Retention time of the sludge in the aerobic digester also affects the elevated temperature levels, particularly autothermal temperature levels, which can be maintained. It will be appreciated that numerous factors enter the relationship between sludge retention time and temperature, such as degradability of the sludge and strength (solids level) of the sludge. In the broad practice of the present invention, the sludge retention time in the first digestion zone is from 4 to 48 hours. Preferably, the sludge retention time in the first digestion zone is in the range of from 12 to 30 hours, and suitably from 12 to 24 hours.

First digestion zone 110 is provided with mechanical agitation means 112 which may be the same type employed as means 103 in aeration zone 102, together with means for continuously recirculating one of the second gas and activated sludge fluids against the other fluids in the digestion zone.

The second gas comprising at least 80% oxygen is introduced to the covered aerobic digestion zone 110 and mixed with the sludge therein in sufficient quantity and rate for aerobic digestion of the sludge while maintaining total suspended solids content of the sludge at least at 20,000 mg/l.

Oxygen-depleted digestion gas of at least 40% oxygen purity is discharged from the covered digestion zone 110 through conduit 118 at rate such that its oxygen content is at least 35% of the oxygen content of the oxygen feed gas entering through conduit 117. The gas in conduit 118 is introduced to covered aeration zone 102, as at least a major part of the aforementioned first gas supplying the oxygen requirement for biochemical oxygenation of wastewater. If needed, a supplementary external source of oxygen-containing gas may be supplied to augment the oxygen-containing gas stream in line 118.

After the desired level of aerobic digestive treatment is completed in zone 110, partially stabilized sludge is discharged from the first covered digestion zone 110 in line 114 and passed to the anaerobic treatment portion of the integrated system. In this embodiment the second anaerobic digestion zone comprises an acidification sub-zone 120a and a methane fermentation sub-zone 120b. The partially stabilized sludge in line 114 from the first digestion zone 110 is introduced to the acidification sub-zone 120a and maintained therein for sludge retention time of from 24 to 60 hours as required for sludge acidification. The contents of sub-zone 120a are continuously mixed by agitation means 121a to maintain a uniform rate of degradation of carbohydrates, fats and proteins to lower fatty acids therein. After completion of the necessary retention time in sub-zone 120a, the acidified sludge is discharged therefrom in line 126. If the temperature of the sludge exciting zone 120a is at elevated temperature above optimum methane-forming levels, the temperature of the acidified sludge is desirably lowered to ensure satisfactory operation of methane-forming sub-zone 120b. Accordingly, the sludge in conduit 126 is passed through heat exchanger 115 against a coolant stream flowed through the heat exchanger in conduit 160. The resulting partially cooled, partially stabilized sludge discharged from heat exchanger 115 then flows through conduit 127 to methane fermentation sub-zone 120b. The coolant heat exchange medium in line 160 may suitably comprise a cooling water stream, as for example a portion of the effluent from the secondary clarifier from line 106 or, as in the previously described embodiment, the influent sludge feed stream to the digestion system.

The anaerobic digestion sub-zone 120b comprises the methane-forming digestion step of the process. For optimal operation, the sludge in the methane fermentation sub-zone is maintained at a temperature of from 35° C. to 40° C., and preferably from 37° C. to 38° C. The contents of zone 120b are continuously mixed by agitation means 121b, thereby creating a large zone of active decomposition and significantly increasing the rate of the stabilization reactions therein. Sludge retention time in the methane fermentation sub-zone is preferably between 4 days and 8 days under the previously discussed considerations governing the anaerobic second digestion zone sludge retention duration. Methane gas produced by the biochemical reactions occurring in sub-zone 120b is discharged therefrom in conduit 128 having flow control valve 129 disposed therein. A portion of this discharged methane gas may be passed to the boiler 130 in conduit 132, while the remaining portion is withdrawn from the process in conduit 131 to further treatment and/or other end use steps. The further stabilized sludge, containing no more than 40% of the original biodegradable volatile suspended solids content of the influent sludge and preferably no more than 20% thereof, is discharged from the process in conduit 133.

Figure 3:
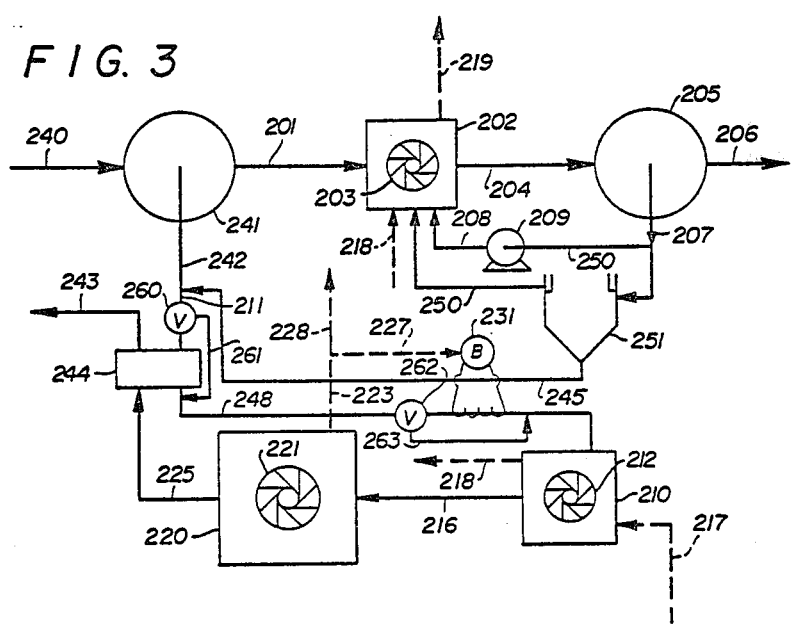
FIG. 3 is a schematic flowsheet according to yet another embodiment of the invention, wherein sludges from primary and secondary wastewater treatment steps are passed to the sludge digestion zones.

FIG. 3 is a schematic flowsheet of another embodiment of the invention wherein sludge from primary and secondary wastewater treatment steps are passed to the sludge digestion system. This embodiment illustrates a process sequence under the instant invention in which a thermophilic aerobic first digestion step is integrated with a thermophilic anaerobic second digestion step. Heretofore, thermophilic anaerobic digestion has not been widely employed in commercial practice. The reason for such limited usage is that the problems attendant conventional mesophilic anaerobic operation of inherent thermal instability and extreme sensitivity to change in process conditions, as discussed earlier herein, are present in thermophilic anaerobic digestion to an even more critical extent. In fact, it is because of the erratic operating stability of thermophilic anaerobic digestion that this sludge treatment process has received little attention to date in commercial sludge digestion applications. These problems of operating instability and undue sensitivity to process fluctuations are overcome in the thermophilic aerobic/anaerobic embodiment of the invention in the same manner as described earlier herein in connection with the embodiments of the instant invention employing an anaerobic mesophilic second digestion step.

In the FIG. 3 system, raw wastewater composed, for example, of municipal sewage, industrial wastewater, and storm water flows through conduit 240 into the primary sedimentation zone 241. Sedimentation zone 241 may suitably consist of a gravity clarifier of a conventional type well-known in the art. In the sedimentation zonethe influent wastewater is separated into a reduced BOD-containing primary effluent, which flows by conduit 201 into aeration zone 202, and a settled sludge underflow, removed from zone 241 via conduit 242. The aeration zone 202 also receives oxygen-containing aeration gas in conduit 218, sludge thickener supernatant liquid in conduit 250 and return activated sludge in conduit 208. A fluid mixing and recirculation means 203 is disposed in aeration zone 202 for mixing of the various fluids introduced to the aeration zone to form mixed liquor and simultaneous continuous recirculation of one of the mixed liquor and oxygen-containing aeration gas fluids against the other fluids therein. As discussed earlier herein, the fluid mixing and recirculation means may suitably comprise a submerged gas sparger in combination with a sub-surface mixing impeller, or a surface aeration impeller device. After the requisite aeration period, e.g. 2–6 hours, a BOD-depleted mixed liquor and an oxygen-depleted aeration gas of at least 21% oxygen (by volume) are discharged from the aeration zone 202 in conduits 204 and 219, respectively.

The BOD-depleted oxygenated mixed liquor in conduit 204 is passed to the secondary sedimentation zone 205 wherein activated sludge is separated from the purified liquid, with the latter being discharged from the process in line 206. The settled activated sludge is withdrawn from the secondary sedimentation zone in line 207. A major portion of this withdrawn sludge is recirculated as the recycle sludge to the aeration zone 202 in line 208 having recycle pump 209 disposed therein. The remaining unreturned portion, which may comprise between 3% and 10% of the sludge in conduit 207, is flowed in conduit 252 to the sludge thickener 251.

Sludge thickener 251 comprises a further sludge settling thickening zone which concentrates the sludge to between 2% and 6% solids, i.e., an MLSS level of between 20,000 and 60,000 mg/l. The thickened sludge underflow is flowed in line 245 and joined with primary sludge in line 242 from the primary sedimentation zone 241 to form the combined sludge stream in line 211. The supernatant liquid from the sludge thickener 251 is passed in line 250 to the aeration zone 202, as previously described.

The combined sludge stream in line 211 may be partially warmed, if desired, by indirect heat exchange with the warm stabilized sludge discharged from the second digestion zone 220, as described more fully hereinafter, and is then flowed to the first digestion zone 210 in conduit 248. Prior to introduction to the first digestion zone 210, the sludge in conduit 248 may be further heated by the methane-fired heater 231, which receives methane gas for combustion from conduit 227.

If ambient temperature conditions are sufficient to eliminate the necessity of heating the influent sludge to the digestion system, it may be by-passed around heat exchanger 244 and heater 231 by the by-pass conduits 261 and 263, respectively.

In the covered first digestion zone 210, thermophilic aerobic digestion of the influent waste sludge is carried out. Aeration gas containing at least 50% oxygen (by volume) and preferably at least 80% is delivered to the digestion zone 210 in conduit 217, and mechanical agitation means 212 mix and simultaneously continuously recirculate the influent sludge mixture against the oxygen-containing gas. The aeration gas feed rate and the energy input to mechanical agitation means 212 are such that oxygen is dissolved in the sludge in first digestion zone 210 in sufficient quantity and rate to satisfy the aerobic digestion respiration requirements of the sludge therein.

Sludge is retained in the first digestion zone 210 at thermophilic temperature of 45° to 75° C. for duration of from 4 to 48 hours to partially reduce the biodegradable volatile suspended solids content of the sludge. Partially stabilized sludge is discharged from the aerobic digestion zone 210 in line 216 and the oxygen-depleted digestion gas is separately discharged from the digestion zone in line 218.

From line 216 the partially stabilized sludge from the first digestion zone is introduced to the covered second digestion zone 220.

The second digestion zone 220 comprises a thermophilic anaerobic digester. For optimal operation the sludge in this digestion zone is maintained at temperature in the anaerobic thermophilic temperature range of between 40° C. and 60° C., and preferably between 45° C. and 50° C. As a result of thermophilic operation in both the first and the second digestion zones in this embodiment of the invention, the partially stabilized sludge from the first digestion zone may be passed directly to the second digestion zone as shown without heating or cooling heat exchange between the zones if the thermophilic temperatures in the respective zones are sufficiently closely aligned. Alternatively, it may be desirable in some cases to operate the second digestion zone at sufficiently higher or lower temperatures relative to the first aerobic digestion zone so that interzone heating or cooling of the partially stabilized sludge from the aerobic digestive step is advantageous. Heating may be carried out by a methane-fired heater similar to heater 231; cooling may be carried out by heat exchange of the partially stabilized sludge from the first digestion zone with the influent sludge flowed to the digestion system, as described hereinabove in connection with the embodiments of the invention shown in FIGS. 1 and 2. Additionally, since it is even more critical in thermophilic anaerobic digestion than in mesophilic anaerobic digestion to ensure that temperature fluctuations do not occur in the digestion zone, it may be desirable to employ a well-insulated tank as the sludge treatment vessel for the thermophilic anaerobic digestion step, thereby providing a safeguard against severe climatic variations.

In the second digestion zone 220, the sludge is continuously mixed by mechanical agitation means 221 to maintain a high rate of stabilization. Methane gas produced as a result of the biochemical reactions occurring in the anaerobic digestion is discharged from the second digestion zone in conduit 223. This methane gas may be mixed with oxygen-containing gas such as air or the oxygen-depleted digestion gas from the aerobic digestion zone and combusted as fuel to provide heat for maintaining sludge in one or both of the digestion zones at elevated temperature. In the process as shown a portion of the methane gas from conduit 223 is passed by conduit 227 to the methane boiler 231 and combusted to provide heat for maintaining sludge in the first digestion zone at thermophilic temperature of from 45° to 75° C. The remaining portion is discharged from the process system in conduit 228. The further stabilized sludge from the anaerobic digestion zone, containing no more than 40% of the biodegradable volatile suspended solids content of the influent sludge to the digestion system in line 248 and preferably no more than 20% thereof, is discharged from the second digestion zone through conduit 225, passed through heat exchanger 244 for recovery of heat from the discharged sludge and finally discharged from the process system in conduit 243.

The nature of the biological activity in the aerobic digestion zone in the FIG. 3 embodiment just described is significantly different than the biological activity in the aerobic zone of the earlier described FIG. 2 embodiment of the invention, by virtue of the difference in sources of the sludge. In the FIG. 2 embodiment, the sludge passed to the digestion system as the influent feed therefor is solely activated sludge from the secondary wastewater treatment system, whereas in the FIG. 3 embodiment the influent sludge comprises both the secondary sludge from the activated sludge treatment step and also the primary sludge from the raw wastewater sedimentation step. Since the organic material of secondary sludge is primarily viable microorganisms, aerobic digestion of this sludge comprises the various biochemical reaction steps of cell lysis, assimilation of the lysis products for synthesis of new viable material, and respiration. Primary sludge, on the other hand, is primarily composed of non-viable organic material, which the micro-organisms present in the sludge are able to use as food. Accordingly, during the aerobic digestion of a primary sludge the microbial population of the sludge experiences a substantial cell synthesis phase in addition to cell lysis, assimilation of lysis products and respiration. As a result, aerobic digestion of primary sludge takes place with a greater level of both cell synthesis and cell respiration than is present in aerobic digestion of secondary sludge. Furthermore, aerobic digestion of primary sludge results in a smaller net reduction of biodegradable volatile solids than does aerobic digestion of secondary sludge based on a comparable sludge retention time for digestion. The net reduction of biodegradable volatile solids in the sludge during digestion represents a difference in the competing digestive processes of cell synthesis and cell respiration.

Cellular respiration in the sludge digestion process is exothermic in character and, for the reasons discussed above, primary sludge exhibits a higher heat generating capacity per unit weight of biodegradable volatile suspended solids removed in digestion than does secondary sludge. Accordingly, a lower net reduction in volatile suspended solids is required to achieve and maintain a given temperature level in the aerobic digestion step with primary sludge than with secondary sludge. Thus, the FIG. 3 embodiment of the invention, wherein the sludge to the digestion system comprises both primary and secondary sludge, may be operated at a given temperature with a lower level of volatile suspended solids reduction in the aerobic digestion zone than the aerobic zone in the FIG. 2 embodiment processing only secondary sludge. A lower biodegradable volatile solids reduction in the aerobic zone of the digestion system in turn requires that the sludge retention time in the anaerobic digestion zone be correspondingly increased to obtain a given overall level of volatile suspended solids removal. Since an increased portion of the overall volatile suspended solids removal is effected in the anaerobic digestion zone in such a case, the system processing primary sludge can therefore obtain an increased level of methane generation in the anaerobic digestion zone relative to the digestion system processing only secondary sludge. Thus, the FIG. 3 embodiment is inherently capable of providing greater quantities of methane than the FIG. 2 system, but at a cost of increased sludge retention time in the anaerobic digestion zone in the former case.

Figure 4:
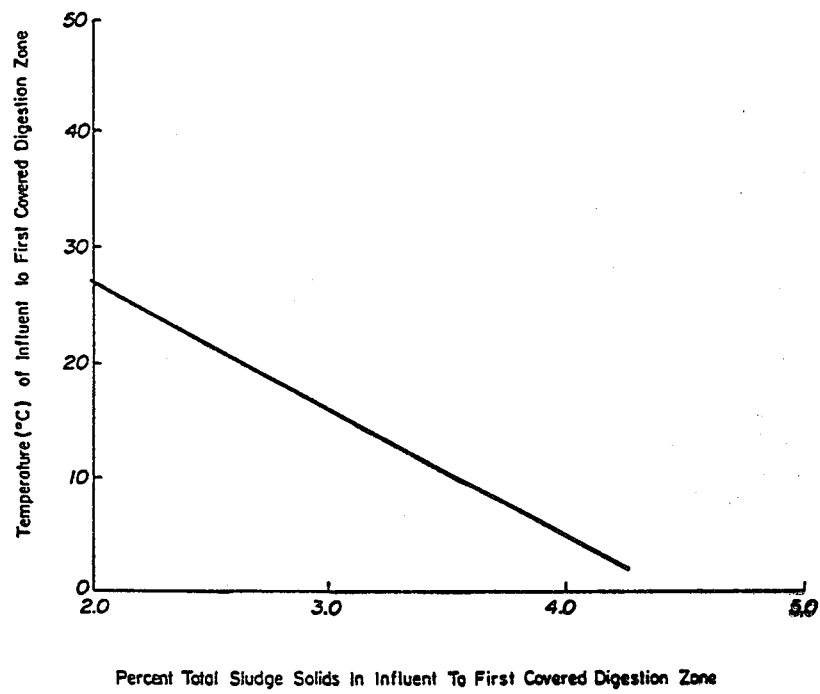
FIG. 4 is a graph of the temperature of the influent sludge to the first digestion zone which is necessary to maintain a 50° C. operating temperature in the first digestion zone, plotted as a function of the total suspended solids content (MLSS) of the influent sludge to the first digestion zone.

With respect to the foregoing discussion, the capacity for heating the influent sludge to the digestion system prior to introduction of the sludge to the aerobic digestion zone is provided in each of the previously described illustrative embodiments of the invention. Such heating may or may not be necessary in a given application depending upon various factors such as sludge solids content, ambient temperature, aerobic digestion zone sludge retention time and the type of sludge involved. FIG. 4 is a graph of the temperature of the influent sludge to the first digestion zone which is necessary to autothermally maintain a 50° C. operating temperature in the first digestion zone for a 24 hour sludge retention time, plotted as a function of the total suspended solids content (MLSS) of the influent sludge to the first digestion zone. This graph represents a biological secondary sludge having a volatile suspended solids/total suspended solids (VSS/TSS) ratio of 0.79 and a biological heat content of 14,000 BTU/lb. volatile suspended solids removed.

The graph of FIG. 4 indicates that thermophilic operation may be achieved without the need for heating of the influent sludge to the digestion system prior to its introduction to the aerobic digestion zone when the influent sludge has a sufficient solids concentration. For example, if a sludge with a 3% total solids concentration is to be digested, the temperature of the sludge introduced to the thermophilic aerobic zone need only be about 16° C. to maintain auto-thermal operation.

Figure 5:
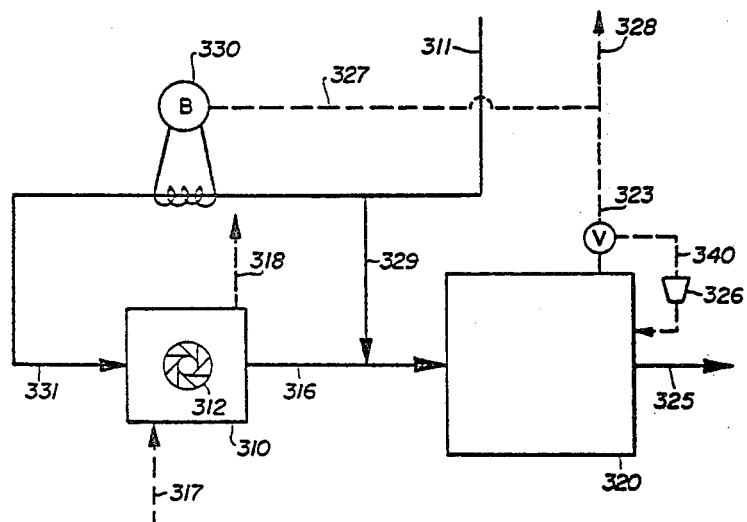
FIG. 5 is a schematic flowsheet of still another embodiment of the invention, wherein a minor portion of the influent sludge to the process system is diverted to the second digestion zone.

All of the previously described embodiments of the invention are able to produce a completely pasteurized sludge product, since in each of these cases all of the influent sludge to the digestion system is passed through an aerobic digestion zone in which high temperatures on the order of at least 50°-52° C. may be employed to provide complete sludge pasteurization. However, there may be applications in which the final disposition of the sludge does not require a completely pasteurized product, or where the sludge itself does not require pasteurization because of the absence of any appreciable concentration of pathogens therein FIG. 5 is a schematic flowsheet of another embodiment which is within the broad scope of the present invention, wherein a minor portion of the influent sludge to the process system is diverted to the second digestion zone, and which is suitable for the aforementioned sludge digestion applications in which complete sludge pasteurization is not required. In the FIG. 5 embodiment, a major portion of the influent sludge entering the process system in line 311 is fed to the covered first digestion zone 310 by line 331. Prior to introduction to first digestion zone 310, the sludge in line 331 can be heated, if desirable, by methane-fired boiler 330.

Oxygen-containing aeration gas, comprising at least 50% and preferably at least 80% oxygen (by volume), is introduced to the aerobic digestion zone 310 through conduit 317. The sludge flowing into this zone is suitably mixed and continuously recirculated against the oxygen-containing aeration gas therein by the agitation means 312, with the sludge and aeration gas mixing being carried out in sufficient quantity and rate for aerobic digestion of sludge in zone 310. Sludge is maintained in the aerobic digestion zone at thermophilic temperature of between 45° and 75° C. for a retention time of between 4 and 48 hours. Oxygen-depleted digestion gas is discharged from the first digestion zone in line 318 and sludge partially depleted in biodegradable suspended solids content is separately discharged from the digestion zone in line 316.

The partially stabilized sludge in line 316 is then introduced to the covered second digestion zone 320 operating in the mesophilic temperature range. Since the temperature of the sludge discharged from the first digestion zone is between 45° C. and 75° C., its temperature is suitably lowered prior to introduction to the second digestion zone so that preferred mesophilic temperature conditions for the mesophilic anaerobic digestion process in the second digestion zone can be maintained. In the illustrative embodiment, the minor portion of the influent sludge to the process by-passes the methane boiler 330 and aerobic digestion zone 310 in conduit 329 and is mixed directly with the warm sludge in conduit 316. The flow rate of the influent sludge bypass stream is adjusted so that the temperature of the combined sludge stream introduced to the anaerobic digestion zone 320 is sufficient to maintain an operating temperature in zone 320 of between 35° C. and 40° C.

In the second digestion zone the sludge is mixed by recirculation of methane gas against the sludge therein in order to actively maintain the stabilization rate in the second zone at high levels. Methane gas produced as a result of the biochemical reactions occurring in the second digestion zone 320 is discharged therefrom in conduit 323. A side stream of this gas is diverted into flow loop 340 having compressor 326 disposed therein and the resultant compressed methane gas is introduced into the sludge in the second digestion zone, as for example by sparging means (not shown), to effect the aforementioned sludge mixing and recirculation. From line 323, a portion of the methane gas may be passed in line 327 to the methane-fired boiler 330 and the remainder is discharged from the process system in line 328. The further stabilized sludge, containing less than 40% of the original biodegradable volatile suspended solids content of the influent sludge to the process system in line 331, is discharged from the second digestion zone in conduit 325, to further treatment (e.g., dewatering) and/or final disposal.

The advantages of this invention are illustrated by the following examples:

EXAMPLE I

This example compares the performance of the instant invention operated according to the FIG. 2 embodiment with a conventional high rate anaerobic system. The further description will be based on treatment of waste sludge from a 10 million gallon per day (MGD) wastewater treatment plant, and referenced to the FIG. 2 schematic flowsheet.

A combined 50-50 primary and secondary sludge initially at 18° C. is fed to the digestion system of the FIG. 2 process in conduit 111. The sludge, having a total suspended solids content of 39,400 mg/l and a volatile suspended solids/total suspended solids fraction of 72%, is fed to the system at a flow rate of 0.09 MGD. To maintain the sludge in aerobic digestion zone 110 at a 50° C. operating temperature with 24 hour sludge retention time, the influent sludge is heated to about 23° C. by the methane boiler 130. Based on a 50% conversion efficiency of the methane gas fuel value to heat, approximately 25,000 cubic feet per day of the methane gas produced in the anaerobic digestion zone is needed to supply the boiler 130.

Approximately 8% volatile suspended solids (16% biodegradable volatile suspended solids; the biodegradable volatile suspended solids are approximately 50% of total volatile suspended solids) reduction is obtained in the aerobic digestion so that a partially digested sludge with a volatile suspended solids content of 26,100 mg/l is fed by conduit 114 to acidification sub-zone 120*a*. This sub-zone is operated at thermophilic temperature with a 24 hour sludge retention time. A 10% reduction of the influent volatile suspended solids fraction is effected in this stage. A sludge with a volatile suspended solids content of 23,500 mg/l is then discharged to the methane fermentation sub-zone 120*b* in conduit 126. Sufficient heat is removed from the discharged sludge in heat exchanger 115 to ensure an operating temperature in the methane fermentation sub-zone 120*b* of 38° C.

The methane fermentation sub-zone is operated with a 5 day sludge retention time, resulting in an overall volatile suspended solids reduction of 40% for the integrated system (biodegradable volatile suspended solids reduction of 80%). The methane fermentation sub-zone produces approximately 73,000 cubic feet of methane gas per day, amounting to a total fuel value of 43 million BTU per day. Since 25,000 cubic feet of methane gas per day is needed to operate methane boiler 130, 48,000 cubic feet of methane gas per day, amounting to a total fuel value of 29 million BTU per day, is available for export from the sludge digestion system.

If the 0.09 MGD of combined sludge on which the above description is based is instead passed to a conventional high rate anaerobic digestion tank approximately a 13 day sludge retention time would be necessary to achieve the same volatile solids reduction. Although 128,000 cubic feet of methane gas per day, amounting to about 77 million BTU per day, is produced by the conventional high rate digester tank, approximately 60 million BTU per day of heating is needed, at a 50% conversion of fuel value to heat, to maintain optimum operating temperature conditions in the high rate tank. Thus, the conventional system, as compared to the above-described embodiment of the present invention, requires 86% more tankage, based on retention time requirements, and has available for export approximately 40% less methane under normal operating conditions.

EXAMPLE II

This example describes a specific operation of the present invention according to the FIG. 5 embodiment. The influent sludge feed comprises 0.06 MGD of a combined 50—50 primary and secondary sludge from a wastewater treatment facility. The influent sludge stream in line 311 at 20° C. and 4% total suspended solids (VSS/TSS=0.75) is divided, with 0.046 MGD flowing in line 331 directly to the thermophilic aerobic digestion zone and 0.014 MGD forming the bypass stream in conduit 329. Inasmuch as the temperature and suspended solids concentration of the sludge in line 311 are sufficiently high to promote autothermal operation in the thermophilic aerobic digestion zone 310, there is no need in this instance to heat the sludge prior to introduction thereof to the aerobic zone. The retention time in the first digestion zone 310 is approximately 24 hours and, as indicated, thermophilic temperatures therein are reached autothermally. A pasteurized sludge at temperature of 50° C. is discharged from the aerobic digestion zone in conduit 316 and is mixed with the cool bypass stream from conduit 329. This combined sludge stream then flows to the anaerobic digestion zone 320 in which the sludge is maintained in the absence of oxygen for approximately 8 days resulting in approximately 40% overall volatile solids reduction (80% biodegradable volatile suspended solids reduction). The anaerobic digestion zone produces methane gas at a rate of approximately 72,000 cubic feet per day, amounting to about 40 million BTU per day. All of this methane is available for export from the process system.

If the 0.06 MGD of combined influent sludge feed is instead passed to a conventional high rate anaerobic digestion tank, approximately a 15-day retention time would be necessary to achieve the same volatile solids reduction. Although 90,000 cubic feet per day of methane gas, amounting to about 50 million BTU per day, is produced by the conventional anaerobic digestion tank, approximately 45 million BTU per day is needed, at a 50% conversion of fuel value to heat, to maintain optimum anaerobic operating temperature conditions in the high rate tank. Therefore, in this case, a conventional anaerobic digestion system requires approximately a 65% longer sludge retention time but generates only a net gas energy equivalent of 5 million BTU per day compared to 40 million BTU per day for the combined system. Therefore, after using the internally generated methane gas as a source of heat, the conventional system has substantially less methane gas available for export than does the process of the present invention.

EXAMPLE III

This example compares the performance of the instant invention when operated according to the FIG. 1 embodiment with a conventional high rate anaerobic system.

A secondary sludge from an oxygenation wastewater treatment system, initially at 15° C., is first heated in heat exchanger 22 with anaerobic digester effluent and then further heated with thermophilic aerobic digester effluent in heat exchanger 15. The first heat exchange step in heat exchanger 22 raises the temperature of the influent sludge from 15° C. to about 25° C. while lowering the temperature of the stabilized sludge effluent from the anaerobic digestion zone 20 from about 35° C. to 25° C. The second heat exchange step in heat exchanger 15 increases the influent sludge temperature to about 30° C. while the sludge discharged from the aerobic digestion zone 10 is reduced in temperature from about 50° C. to 45° C. The influent sludge having a total solids content (MLSS) of 34,400 mg/l and a volatile suspended solids/total suspended solids fraction of 78% is introduced to the first digestion zone 10 at a rate of 0.06 MGD. A 50° C. operating temperature is maintained with a 24 hour sludge retention time in the aerobic first zone.

Approximately 16% volatile suspended solids reduction (32% biodegradable volatile suspended solids reduction) is achieved in the aerobic stage so that a partially stabilized sludge with a volatile suspended solids content of 22,500 mg/l is introduced, after heat exchange with the influent sludge in heat exchanger 15 to the anaerobic digestion zone in conduit 16.

The anaerobic digestion zone operates with an 8 day retention time, resulting in an overall volatile suspended solids reduction of 42% (biodegradable volatile suspended solids reduction of 84%) for the integrated system. The anaerobic digestion zone 20 produces approximately 51,800 cubic feet of methane gas per day, amounting to a total fuel value of about 28 million BTU per day. All of this methane gas is available for export from the digestion system.

If the 0.06 MGD of influent sludge to the digestion process described above was instead passed to a conventional high rate anaerobic digestion tank, at least a 14 day sludge retention time would be necessary to achieve the same volatile suspended solids reduction. Although 84,600 cubic feet of methane gas per day is produced in such conventional high rate system, amounting to about 47 million BTU per day, approximately 45 million BTU per day is needed, at a 50% conversion of fuel value to heat, to maintain optimum operating temperature conditions in the high rate tank. The conventional anaerobic system therefore requires about 55% more tankage, and has about 26 million BTU of methane gas per day less to export, than does the corresponding above-described system of the present invention.

Although preferred embodiments have been described in detail, it will be appreciated that other embodiments are contemplated with modification of the disclosed features, as being within the scope of the invention. For example, the aerobic digestion step of the instant process may be carried out in serial treatment tanks or in a partitioned basin wherein the constituent tanks in the series or the separate volumes in the partitioned basin function as sub-zones of the aerobic digestion zone. In such manner, the aerobic digestion zone may be provided in the form of a sludge digestion chamber with multiple compartments for staged occurrent sludge and aeration gas flow; such aerobic digestion zone configuration is well known to those skilled in the art and is disclosed for example in the aforementioned U.S. Pat. No. 3,926,794 to N. P. Vahldieck.

What is claimed is:

1. A process for digestion of sludge comprising the steps of:
   (a) introducing said sludge and aeration feed gas comprising at least 20 percent oxygen (by volume) to a first digestion zone and mixing same therein in sufficient quantity and rate for aerobic digestion of the sludge while maintaining total suspended solids content (MLSS) of the sludge at least at 20,000 mg/l and temperature of the sludge in the range of from 35° to 75° C. in said first digestion zone;
   (b) continuing the aerobic digestion of step (a) for sludge retention time (duration) of from 4 to 48 hours to partially reduce the biodegradable volatile suspended solids content of the sludge introduced to said first digestion zone and thereby form partially stabilized sludge, and discharging said partially stabilized sludge from said first digestion zone;
   (c) anaerobically digesting the partially stabilized sludge discharged from said first digestion zone in a covered second digestion zone while maintaining temperature of the sludge therein in the range of from 25° to 60° C. for sufficient solids retention time (duration) to further reduce the biodegradable volatile suspended solids content of the sludge to less than about 40 percent of the biodegradable volatile suspended solids content of the sludge introduced to the first digestion zone in step (a), and form methane gas; and
   (d) separately discharging further stabilized sludge and said methane gas from said second digestion zone.

2. A process according to claim 1 wherein said oxygen-containing aeration feed gas and said sludge are mixed in said first digestion zone in sufficient quantity and rate to obtain utilization of from 0.10 to 0.35 lbs. oxygen per lb. of volatile suspended solids (VSS) in said sludge introduced to said first digestion zone.

3. A process according to claim 1 wherein the volatile suspended solids content of the sludge introduced to said first digestion zone is reduced by from 5 to 20 percent in said first digestion zone.

4. A process according to claim 1 comprising providing said first digestion zone with a cover to form a gas space overlying the sludge therein, and wherein said aeration feed gas comprises at least 50 percent oxygen (by volume).

5. A process according to claim 4 comprising recirculating one of the aeration gas and sludge fluids against the other fluid in said first digestion zone and discharging oxygen-depleted digestion gas of at least 21 percent oxygen (by volume) from said first digestion zone separately from said partially stabilized sludge discharged therefrom.

6. A process according to claim 1 wherein said sludge introduced to said first digestion zone has a total suspended solids content of between 20,000 and 80,000 mg/l.

7. A process according to claim 1 wherein sludge retention time (duration) of said sludge in said first digestion zone is from 12 to 30 hours.

8. A process according to claim 1 wherein said sludge is heated prior to said introduction to said first digestion zone, to maintain said temperature of from 35° to 75° C. in said first digestion zone.

9. A process according to claim 1 wherein said temperature of the sludge in the second digestion zone is maintained in the range of from 35° to 40° C., or mesophilic digestion of sludge in said second digestion zone.

10. A process according to claim 1 wherein said temperature of the sludge in the second digestion zone is maintained in the range of from 45° to 50° C., for thermophilic digestion of sludge in said second digestion zone.

11. A process according to claim 1 wherein sludge retention time of sludge in the second digestion zone is sufficient to further reduce the biodegradable volatile suspended solids content of the sludge to less than about 20% of the biodegradable volatile suspended solids content of the sludge introduced to said first digestion zone in step (a).

12. A process according to claim 1 wherein sludge retention time of sludge in the second digestion zone is from 4 to 12 days.

13. A process according to claim 1 wherein each of said first and second digestion zones has a surface-to-volume ratio less than $0.8 ft^2/ft^3$.

14. A process according to claim 1 wherein the sludge in said second digestion zone is mixed by recirculation of methane gas against the sludge therein.

15. A process according to claim 1 wherein said aeration feed gas is heated prior to said introduction to said first digestion zone, to maintain said temperature of from 35° to 75° C. therein.

16. A process according to claim 1 wherein said sludge is heated prior to said introduction to said first digestion zone by indirect heat exchange with said further stabilized sludge discharged from said second digestion zone.

17. A process according to claim 16 wherein said temperature of sludge in the second digestion zone is maintained in the range of from 35° to 40° C. and said heated sludge is further heated prior to said introduction to said first digestion zone by indirect heat exchange with said partially stabilized sludge discharged from said first digestion zone.

18. A process according to claim 1 wherein said second digestion zone comprises an acidification sub-zone and methane fermentation sub-zone, partially stabilized sludge from said first digestion zone is introduced to said acidification sub-zone and maintained therein for sludge retention time of 24 to 60 hours for sludge acidification, and acidified sludge is discharged from said acidification sub-zone and introduced to said methane fermentation sub-zone and maintained therein at temperature of from 35° to 40° C. for sludge retention time of from 4 to 8 days.

19. A process according to claim 18 wherein sludge in said methane fermentation sub-zone is maintained at temperature of from 37° to 38° C.

20. A process according to claim 18 wherein sludge in said acidification zone is maintained at temperature of between 45° and 75° C. and acidified sludge discharged from said acidification sub-zone is cooled to temperature of from 35° to 40° C. prior to introduction to said methane fermentation sub-zone.

21. A process according to claim 1 comprising treatment of wastewater containing biodegradable suspended solids for BOD removal therefrom, including the steps of:
separating a primary sludge comprising said biodegradable suspended solids from said wastewater to form solids-depleted primary effluent;
mixing said primary effluent and recycle sludge and aerating same at sufficient rate and for sufficient time to form mixed liquor of reduced BOD content;
separating the mixed liquor into purified liquid and activated sludge; and
returning at least a major portion of the activated sludge for mixing with said primary effluent as said recycle sludge, wherein said primary sludge and unreturned activated sludge are introduced to said first digestion zone in step (a), as sludge feed therefor.

22. A process according to claim 1 wherein said methane gas discharged from said second digestion zone is mixed with oxygen-containing gas and combusted as fuel to provide heat for maintaining sludge in at least one of said first and second digestion zones at elevated temperature.

23. A process according to claim 22 wherein said methane gas and oxygen-containing gas are mixed and combusted as fuel to provide heat for maintaining sludge in said first digestion zone at temperature of from 35° to 75° C.

24. A process according to claim 1 wherein temperature of sludge in the first digestion zone is maintained in the thermophilic range of from 45° to 75° C. and temperature of sludge in the second digestion zone is maintained in the range of from 30° to 60° C.

25. A process according to claim 1 wherein the mixing of sludge and aeration feed gas in the first digestion zone in sufficient quantity and rate for aerobic digestion of sludge therein is effected by oxygenating the sludge in the first digestion zone at a rate which is equal to at least 10% of the empirically calculated specific oxygen uptake rate (SOUR) value.

26. A process according to claim 1 wherein the mixing of sludge and aeration feed gas in the first digestion zone in sufficient quantity and rate for aerobic digestion of sludge therein is effected by sludge oxygenation with the relative quantities of aeration feed gas and sludge and rate of aeration being sufficient to obtain utilization of at least 0.03 lbs. of oxygen per lb. of volatile suspended solids in the sludge introduced to the first digestion zone.

27. A process according to claim 1 wherein a dissolved oxygen content (DO) of the sludge in the first digestion zone is maintained at least at 2 mg/l.

28. In a process for BOD-removal from waste-water in a covered aeration zone and digestion of activated sludge with oxygen gas, including the steps of:
(a) introducing first gas comprising at least 40% oxygen (by volume) and mixing same as aeration gas with the wastewater and recycled sludge in said covered aeration zone to form mixed liquor and contacting said aeration gas with the mixed liquor in sufficient quantity and rate to maintain the dissolved oxygen content (DO) of the mixed liquor at least 0.5 mg/l, separating the mixed liquor into purified liquid and activated sludge, and discharging unconsumed oxygen-containing gas from the aeration zone at rate such that its oxygen count is not more than 40% of the total oxygen introduced to the digestion zone;
(b) returning at least about 85% by weight of the activated sludge to the aeration zone as said recycled sludge;
(c) providing second gas comprising at least 80% oxygen (by volume) and including part of said first gas;
(d) introducing said second gas and the unreturned activated sludge from step (b) to a covered digestion zone and mixing same therein in sufficient quantity and rate for aerobic digestion of the sludge while maintaining total suspended solids content (MLSS) of the sludge at least at 20,000 mg/l;
(e) maintaining the sludge in the digestion zone during step (d) at temperature in the range of from 35° to 75° C.;
(f) separately discharging partially stabilized sludge and oxygen-depleted digestion gas of at least 40% oxygen purity from said digestion zone at rate such that the oxygen content of the oxygen-depleted digestion gas is at least 35% of the oxygen content of said second gas entering said digestion zone;

(g) providing said oxygen-partially depleted digestion gas from step (f) as at least the major part of said first gas introduced to said covered aeration zone in step (a);

the improvement comprising the steps of:

(h) continuing step (e) for sludge retention time (duration) of from 4 to 48 hours to partially reduce the biodegradable volatile suspended solids content of the sludge introduced to said first digestion zone and thereby form partially stabilized sludge;

(i) introducing said partially stabilized sludge from step (f) to a second covered digestion zone;

(j) maintaining a sludge in the second digestion zone under anaerobic conditions at temperature of from 25° to 60° C. for sufficient sludge retention time (duration) to further reduce the biodegradable volatile suspended solids content of the sludge to less than about 40% of the biodegradable volatile suspended solids content of the activated sludge introduced to said digestion zone in step (d), and form methane gas, and separately discharging further stabilized sludge and said methane gas from the second digestion zone.

29. A process for digestion of sludge, comprising the steps of:

(a) introducing said sludge and aeration gas comprising at least 50 percent oxygen (by volume) to a first covered digestion zone and mixing same therein in sufficient quantity and rate for aerobic digestion of the sludge while maintaining the total suspended solids content (MLSS) of the sludge at least at 20,000 mg/l;

(b) maintaining sludge in said first digestion zone during step (a) at temperature in the thermophilic range of from 45° to 75° C.;

(c) continuing step (b) for sludge retention time (duration) of from 4 to 48 hours to partially reduce the biodegradable volatile suspended solids content of the sludge introduced to said first digestion zone and thereby form partially stabilized sludge;

(d) separately discharging said partially stabilized sludge and oxygen-depleted digestion gas of at least 21% oxygen purity from said first digestion zone;

(e) introducing said partially stabilized sludge from step (d) to a second covered digestion zone;

(f) maintaining sludge in the second digestion zone under anaerobic conditions at temperature of from 30° to 60° C. for sufficient solids retention time (duration) to further reduce the biodegradable volatile suspended solids content of the sludge, to less than about 40% of the biodegradable volatile suspended solids content of the sludge introduced to said first digestion zone in step (a), and form methane gas, and separately discharging further stabilized sludge and said methane gas from the second digestion zone.

30. A process for digestion of sludge comprising the steps of:

(a) introducing said sludge and aeration feed gas comprising at least 20 percent oxygen (by volume) to a first digestion zone and mixing same therein in sufficient quantity and rate for aerobic digestion of the sludge while maintaining total suspended solids content (MLSS) of the sludge at least at 20,000 mg/l and temperature of the sludge in the range of from 35° to 75° C. in said first digestion zone;

(b) conducting the aerobic digestion of step (a) so as to reduce the volatile suspended solids content of the sludge introduced to said first digestion zone by from 5 to 20 percent and thereby form partially stabilized sludge, and discharging said partially stabilized sludge from said first digestion zone;

(c) anaerobically digesting the partially stabilized sludge discharged from said first digestion zone in a covered second digestion zone while maintaining temperature of the sludge therein in the range of from 25° to 60° C. for sufficient solids retention time (duration) to further reduce the biodegradable volatile suspended solids content of the sludge to less than about 40 percent of the biodegradable volatile suspended solids content of the sludge introduced to the first digestion zone in step (a), and form methane gas; and (d) separately discharging further stabilized sludge and said methane gas from said second digestion zone.

* * * * *

UNITED STATES PATENT AND TRADEMARK OFFICE
CERTIFICATE OF CORRECTION

PATENT NO. : 4,246,099
DATED : January 20, 1981
INVENTOR(S) : Michael S. Gould and Ladislas C. Matsch It is certified that error appears in the above—identified patent and that said Letters Patent is hereby corrected as shown below:

Title page, first column, line 6, change "Ladistas C. Motsch" to -- Ladislas C. Matsch --.

Signed and Sealed this

Fourteenth Day of July 1981

[SEAL]

Attest:

GERALD J. MOSSINGHOFF

*Attesting Officer*  *Commissioner of Patents and Trademarks*